United States Patent
Davydov et al.

(10) Patent No.: US 10,140,301 B2
(45) Date of Patent: Nov. 27, 2018

(54) DEVICE, METHOD, AND GRAPHICAL USER INTERFACE FOR SELECTING AND USING SETS OF MEDIA PLAYER CONTROLS

(75) Inventors: Anton Davydov, Gilroy, CA (US);
Jorge Fino, San Jose, CA (US);
Policarpo Bonilla Wood, Jr., San Jose, CA (US); Jesse Boettcher, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1102 days.

(21) Appl. No.: 12/958,326

(22) Filed: Dec. 1, 2010

(65) Prior Publication Data
US 2012/0050185 A1  Mar. 1, 2012

Related U.S. Application Data

(60) Provisional application No. 61/379,385, filed on Sep. 1, 2010.

(51) Int. Cl.
*G06F 3/0488* (2013.01)
*G06F 17/30* (2006.01)
*G11B 27/34* (2006.01)

(52) U.S. Cl.
CPC .... *G06F 17/30058* (2013.01); *G06F 3/04883* (2013.01); *G11B 27/34* (2013.01); *G06F 2203/04808* (2013.01)

(58) Field of Classification Search
CPC ................ G06F 3/04883; G06F 2203/04808
USPC ....................................................... 345/173
See application file for complete search history.

(56) References Cited

U.S. PATENT DOCUMENTS

| | | | |
|---|---|---|---|
| 2003/0160808 A1 | 8/2003 | Foote et al. | |
| 2005/0012723 A1* | 1/2005 | Pallakoff | 345/173 |
| 2006/0085751 A1 | 4/2006 | O'Brien et al. | |
| 2006/0235941 A1* | 10/2006 | Arcas et al. | 709/217 |
| 2007/0136679 A1* | 6/2007 | Yang | 715/772 |
| 2007/0157094 A1* | 7/2007 | Lemay | G06F 3/0482 715/717 |
| 2008/0055272 A1* | 3/2008 | Anzures | G06F 1/1626 345/173 |
| 2008/0062141 A1 | 3/2008 | Chandhri | |

(Continued)

OTHER PUBLICATIONS

Pogue, David, "iPhone: The Missing Manual." Aug. 2007, O'Reilly Media, Inc., pp. 10, 34-37, 50.*

(Continued)

*Primary Examiner* — Lisa Landis
(74) *Attorney, Agent, or Firm* — Dentons US LLP

(57) ABSTRACT

A portable electronic device with a touch-sensitive display is configured to separately display sets of media player controls, including a first set and a second set. The device displays the first set while playing a first media item and detects gestures on the touch-sensitive display while displaying the first set and playing the first media item. In response to detecting a first gesture on a first media player control in the first set, the device activates the first media player control and controls playing of the first media item in accordance with activation of the first media player control. In response to detecting a second gesture, the second gesture distinct from the first gesture, the device replaces display of the first set with display of the second set and maintains playing of the first media item.

40 Claims, 29 Drawing Sheets

(56) References Cited

U.S. PATENT DOCUMENTS

| | | |
|---|---|---|
| 2008/0165144 A1* | 7/2008 | Forstall et al. ............... 345/173 |
| 2008/0165152 A1* | 7/2008 | Forstall ................. G06F 1/1626 |
| | | 345/173 |
| 2009/0007017 A1* | 1/2009 | Anzures et al. ............. 715/835 |
| 2009/0177966 A1 | 7/2009 | Chaudhri |
| 2009/0178008 A1* | 7/2009 | Herz et al. ................... 715/840 |
| 2011/0265002 A1* | 10/2011 | Hong et al. .................. 715/702 |

OTHER PUBLICATIONS

International Search Report and Written Opinion dated Nov. 29, 2011, received in International Patent Application No. PCT/US2011/050247, which corresponds to U.S. Appl. No. 12/958,326 (Davydov).
International Preliminary Report on Patentability received for PCT Patent Application No. PCT/US2011/050247, dated Mar. 14, 2013, 7 pages.

* cited by examiner

DEVICE, METHOD, AND GRAPHICAL USER INTERFACE FOR SELECTING AND USING SETS OF MEDIA PLAYER CONTROLS

RELATED APPLICATION

This application claims priority to U.S. Provisional Application Ser. No. 61/379,385, filed Sep. 1, 2010, entitled "Device, Method, and Graphical User Interface for Selecting and Using Sets of Media Player Controls," which is incorporated herein by reference in its entirety.

TECHNICAL FIELD

This relates generally to electronic devices with touch-sensitive surfaces, including but not limited to electronic devices with touch-sensitive surfaces and media players.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to control devices with media players.

But existing methods for navigating in a media player and for selecting and using media player controls are cumbersome and inefficient, particularly in portable devices with small screens. Finding and using the desired music control function is tedious and creates a significant cognitive burden on a user. In addition, existing methods take longer than necessary, thereby wasting energy. This latter consideration is particularly important in battery-operated devices.

SUMMARY

Accordingly, there is a need for computing devices with faster, more efficient methods and interfaces for selecting and using media player controls. Such methods and interfaces may complement or replace conventional methods for selecting and using media player controls. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital video-ing, web browsing, digital music playing, and/or digital video playing. Executable instructions for performing these functions may be included in a non-transitory computer readable storage medium or other computer program product configured for execution by one or more processors.

In accordance with some embodiments, a method is performed at a portable electronic device with a touch-sensitive display. The touch-sensitive display is configured to separately display sets of media player controls, including a first predefined set of media player controls and a second predefined set of media player controls. The method includes: displaying the first predefined set of media player controls while playing a first media item; detecting gestures on the touch-sensitive display while displaying the first predefined set of media player controls and playing the first media item; in response to detecting a first gesture, of the detected gestures, on a first media player control in the first predefined set of media player controls, activating the first media player control and controlling playing of the first media item in accordance with activation of the first media player control; and, in response to detecting a second gesture, of the detected gestures, the second gesture distinct from the first gesture, replacing display of the first predefined set of media player controls with display of the second predefined set of media player controls and maintaining playing of the first media item.

In accordance with some embodiments, a portable electronic device includes a touch-sensitive display, one or more processors, memory, and one or more programs. The touch-sensitive display is configured to separately display sets of media player controls, including a first predefined set of media player controls and a second predefined set of media player controls. The one or more programs are stored in the memory and configured to be executed by the one or more processors. The one or more programs include instructions for: displaying the first predefined set of media player controls while playing a first media item; detecting gestures on the touch-sensitive display while displaying the first predefined set of media player controls and playing the first media item; in response to detecting a first gesture, of the detected gestures, on a first media player control in the first predefined set of media player controls, activating the first media player control and controlling playing of the first media item in accordance with activation of the first media player control; and, in response to detecting a second gesture, of the detected gestures, the second gesture distinct from the first gesture, replacing display of the first predefined set of media player controls with display of the second predefined set of media player controls and maintaining playing of the first media item.

In accordance with some embodiments, a non-transitory computer readable storage medium has stored therein instructions which when executed by a portable electronic device with a touch-sensitive display, the touch-sensitive display configured to separately display sets of media player controls, including a first predefined set of media player controls and a second predefined set of media player controls, cause the device to: display the first predefined set of media player controls while playing a first media item; detect gestures on the touch-sensitive display while displaying the first predefined set of media player controls and playing the first media item; in response to detecting a first gesture, of the detected gestures, on a first media player control in the first predefined set of media player controls, activate the first media player control and control playing of the first media item in accordance with activation of the first media player control; and, in response to detecting a second gesture, of the detected gestures, the second gesture distinct from the first gesture, replace display of the first predefined set of media player controls with display of the second predefined set of media player controls and maintain playing of the first media item.

In accordance with some embodiments, a graphical user interface on a portable electronic device with a touch-sensitive display, a memory, and one or more processors to execute one or more programs stored in the memory includes a plurality of separately displayed sets of media player controls, including a first predefined set of media player controls and a second predefined set of media player controls. The first predefined set of media player controls is displayed while a first media item is played. Gestures on the touch-sensitive display are detected while the first predefined set of media player controls is displayed and the first media item is played. In response to detection of a first gesture, of the detected gestures, on a first media player control in the first predefined set of media player controls, the first media player control is activated and playing of the first media item is controlled in accordance with activation of the first media player control. In response to detection of a second gesture, of the detected gestures, the second gesture distinct from the first gesture, display of the first predefined set of media player controls is replaced with display of the second predefined set of media player controls and playing of the first media item is maintained.

In accordance with some embodiments, a portable electronic device includes: a touch-sensitive display, where the touch-sensitive display is configured to separately display sets of media player controls, including a first predefined set of media player controls and a second predefined set of media player controls; means for displaying the first predefined set of media player controls while playing a first media item; means for detecting gestures on the touch-sensitive display while displaying the first predefined set of media player controls and playing the first media item; means for, in response to detecting a first gesture, of the detected gestures, on a first media player control in the first predefined set of media player controls, activating the first media player control and controlling playing of the first media item in accordance with activation of the first media player control; and, means for, in response to detecting a second gesture, of the detected gestures, the second gesture distinct from the first gesture, replacing display of the first predefined set of media player controls with display of the second predefined set of media player controls and maintaining playing of the first media item.

In accordance with some embodiments, an apparatus for use in a portable electronic device with a touch-sensitive display, the touch-sensitive display configured to separately display sets of media player controls, including a first predefined set of media player controls and a second predefined set of media player controls, includes: means for displaying the first predefined set of media player controls while playing a first media item; means for detecting gestures on the touch-sensitive display while displaying the first predefined set of media player controls and playing the first media item; means for, in response to detecting a first gesture, of the detected gestures, on a first media player control in the first predefined set of media player controls, activating the first media player control and controlling playing of the first media item in accordance with activation of the first media player control; and, means for, in response to detecting a second gesture, of the detected gestures, the second gesture distinct from the first gesture, replacing display of the first predefined set of media player controls with display of the second predefined set of media player controls and maintaining playing of the first media item.

In accordance with some embodiments, a portable electronic device includes a touch-sensitive display unit configured to separately display sets of media player controls, including a first predefined set of media player controls and a second predefined set of media player controls. A processing unit is coupled to the touch-sensitive display unit. The touch-sensitive display unit displays the first predefined set of media player controls while the processing unit plays a first media item. The processing unit may comprise: a gesture detecting unit, which detects gestures on the touch-sensitive display unit while the touch-sensitive display unit displays the first predefined set of media player controls and the processing unit plays the first media item; an activating unit which, in response to detecting a first gesture, of the detected gestures by the gesture detecting unit, on a first media player control in the first predefined set of media player controls, activates the first media player control and controls playing of the first media item in accordance with activation of the first media player control; and a replacing unit which, in response to detecting a second gesture, of the detected gestures by the gesture detecting unit, the second gesture distinct from the first gesture, replaces display of the first predefined set of media player controls with display of the second predefined set of media player controls on the touch-sensitive display unit and maintains playing of the first media item.

Thus, portable electronic devices with touch-sensitive displays are provided with faster, more efficient methods and interfaces for selecting and using media player controls, thereby increasing the effectiveness, efficiency, and user satisfaction with such devices. Such methods and interfaces may complement or replace conventional methods for selecting and using media player controls.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
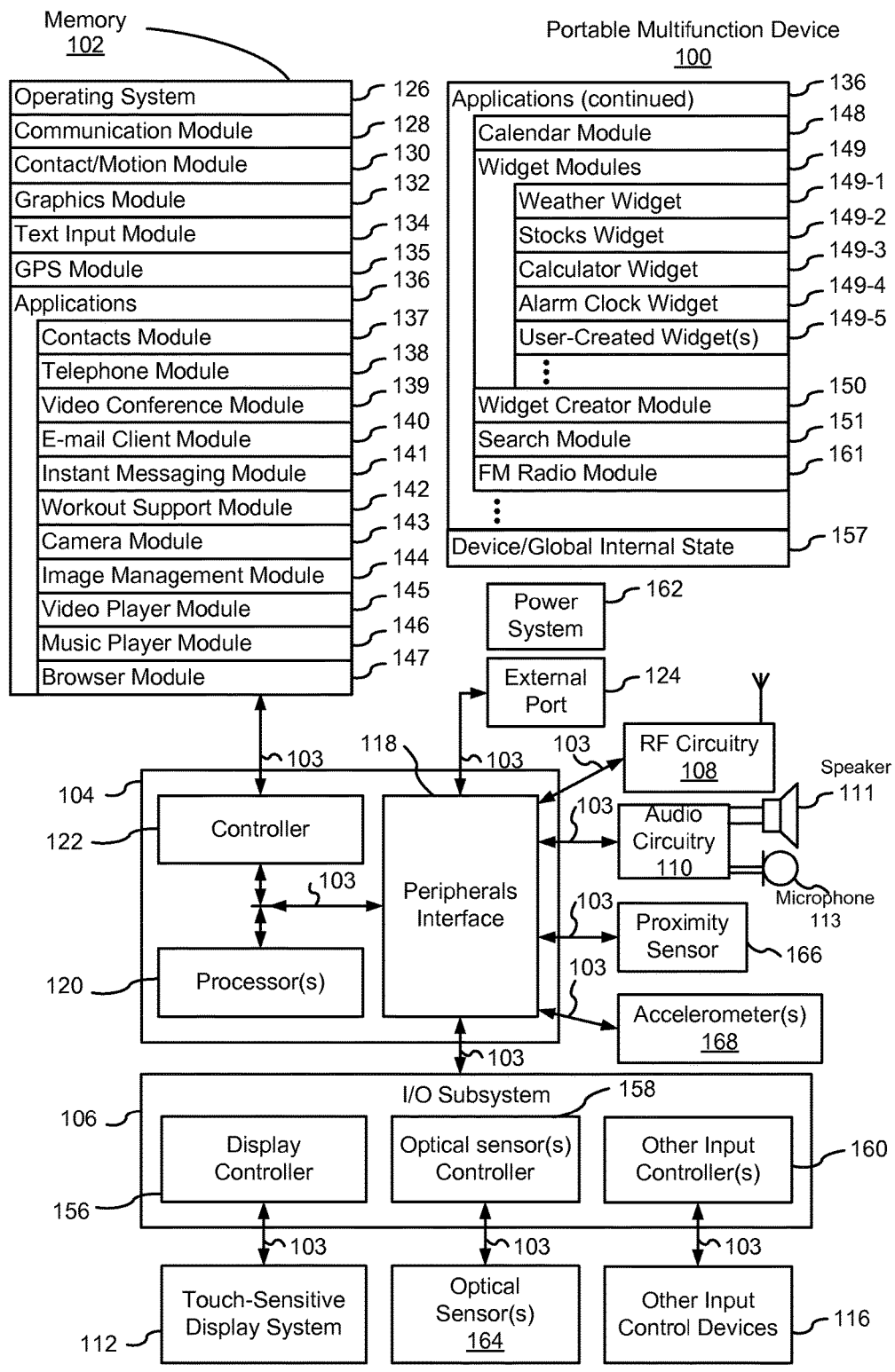
FIGS. 1A and 1B are block diagrams illustrating portable multifunction devices with touch-sensitive displays in accordance with some embodiments.

Many electronic devices include media players. For users, it is important that navigation and control of media player functions be efficient and intuitive. But this is difficult to achieve, particularly in portable electronic devices with small screens.

Here, electronic devices are disclosed that provide for efficient control of the media player via simple finger gestures on a touch-sensitive display. The methods disclosed herein are particularly useful for devices that are so small that there is not enough room for numerous physical buttons and/or virtual controls. The media player controls are formed into sets of media player controls. A user may easily move between the sets of media player controls (e.g., via swipe gestures), activate a desired control (e.g., via a tap gesture), and navigate within the media player with just a single finger (or thumb).

Below, FIGS. 1A-1C, 2, 3A, 3B, and 7 provide a description of exemplary devices. FIGS. 4A-4C and 5A-5O illustrate exemplary user interfaces for navigating in a media player. FIGS. 6A-6D are flow diagrams illustrating a method of selecting and using media player controls. The user interfaces in FIGS. 5A-5K are used to illustrate the processes in FIGS. 6A-6D.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone®, iPod Touch®, iPod Nano® and iPad® devices from Apple Inc. of Cupertino, Calif. In some other embodiments, the computing device is a portable electronic device that is used principally as a media player but may include other functions, such as video recording and/or FM radio reception. Exemplary embodiments of portable electronic devices that are used principally as media players include, without limitation, the iPod Nano® device from Apple Inc. of Cupertino, Calif. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
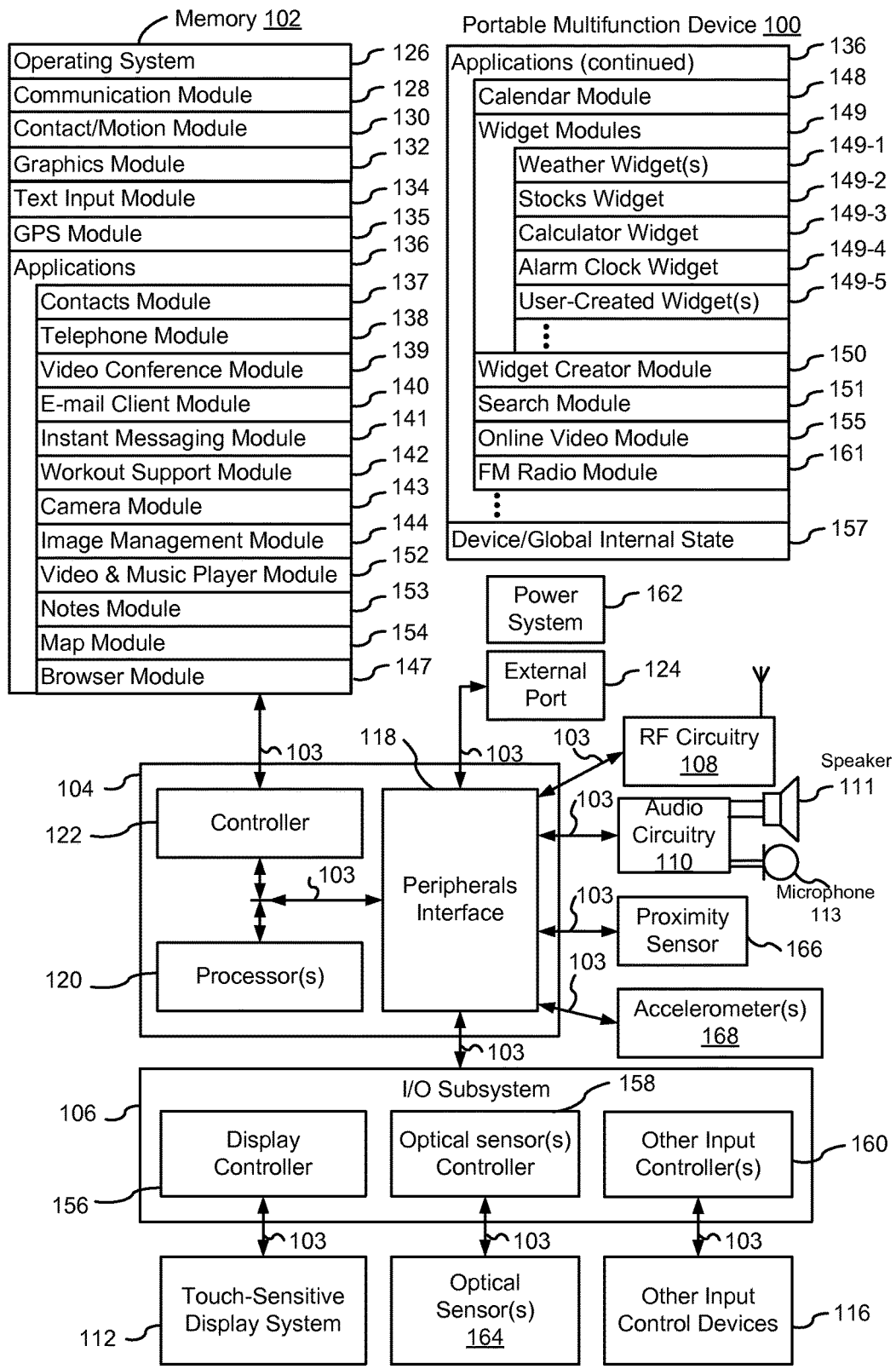

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more non-transitory computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), FM radio, or any other suitable communication protocol, including communication protocols not yet developed as of the filing date of this document.

Audio circuitry 110, speaker 111, and microphone 113 provide an audio interface between a user and device 100.

Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPod Nano® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output. A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components. Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards and/or other text input methods for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  video player module 145;
  music player module 146;
  browser module 147;
  calendar module 148;
  widget modules 149, which may include one or more of: weather widget 149-1, stocks widget 149-2, calculator widget 149-3, alarm clock widget 149-4, and other widgets obtained by the user, as well as user-created widgets 149-5;
  widget creator module 150 for making user-created widgets 149-5;
  search module 151;
  video and music player module 152, which merges video player module 145 and music player module 146;
  notes module 153;
  map module 154;
  online video module 155; and/or
  FM radio module 161.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, and alarm clock widget 149-4) or created by the user (e.g., user-created widget 149-5). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

In conjunction with touch screen 112, display system controller 156, contact module 130, graphics module 132, audio circuitry 110, speaker 111, and RF circuitry 108, FM radio module 161 includes executable instructions that allow the user to select and play FM radio stations.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
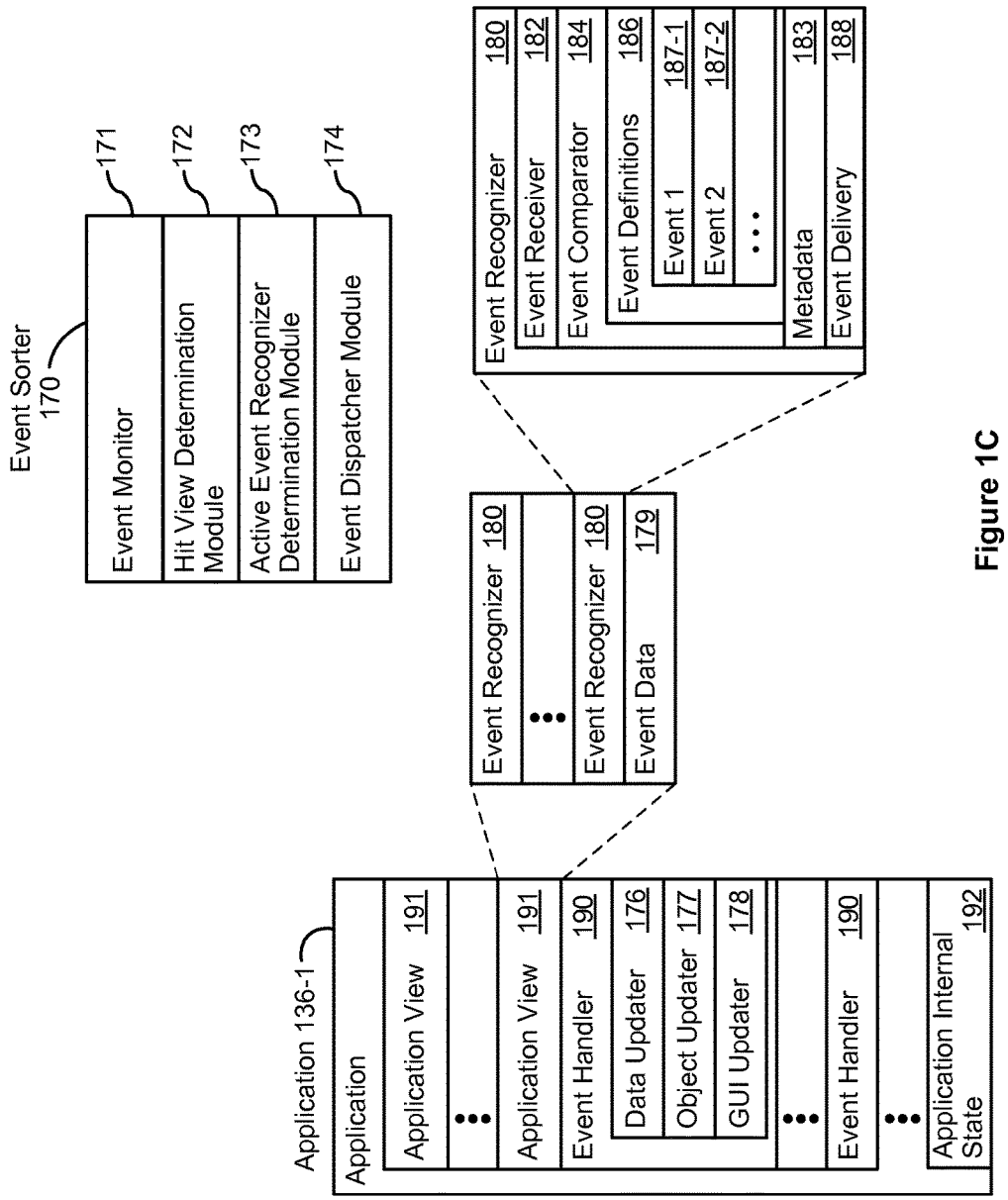
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180).

In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
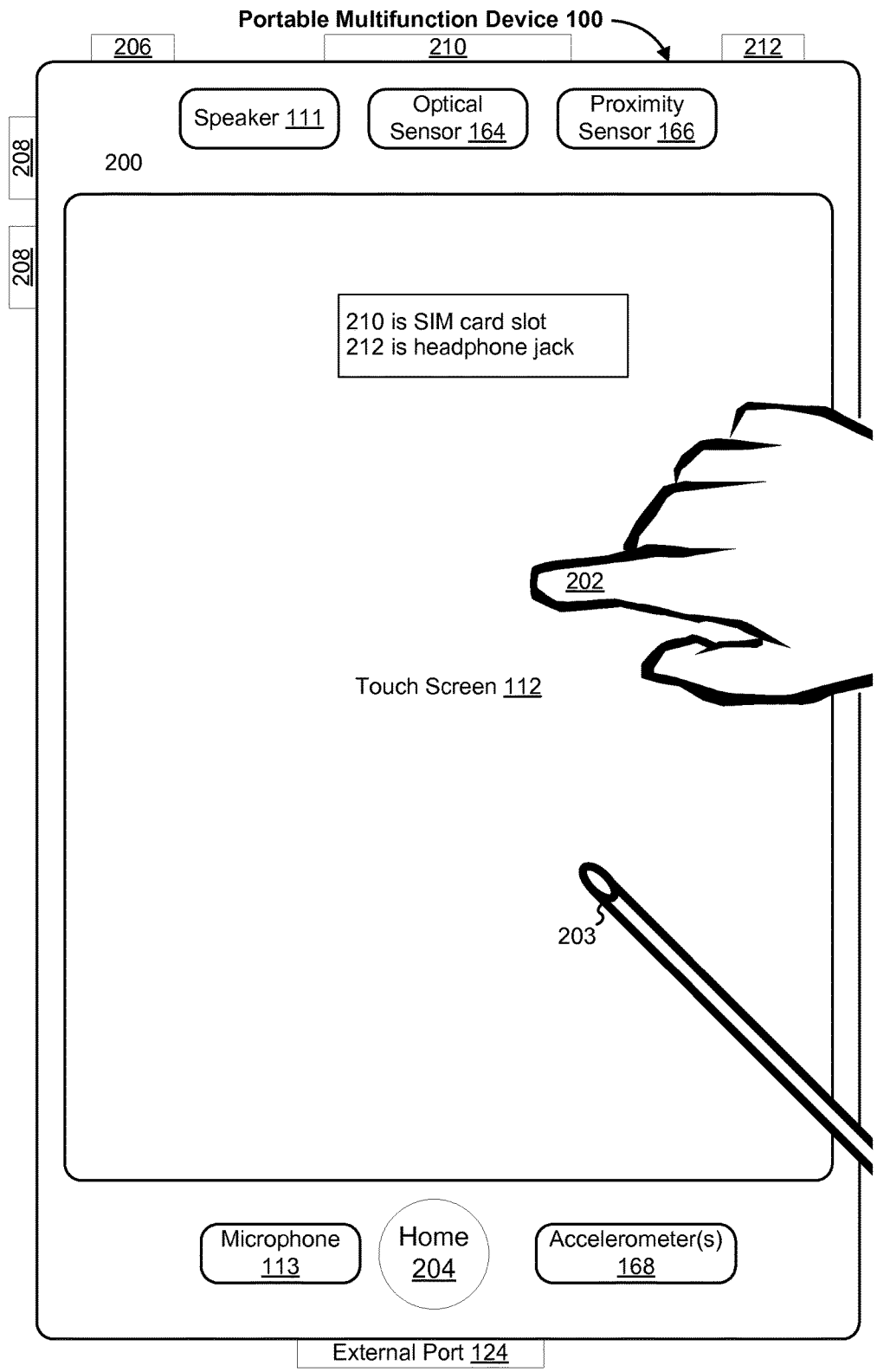
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

Figure 3A:
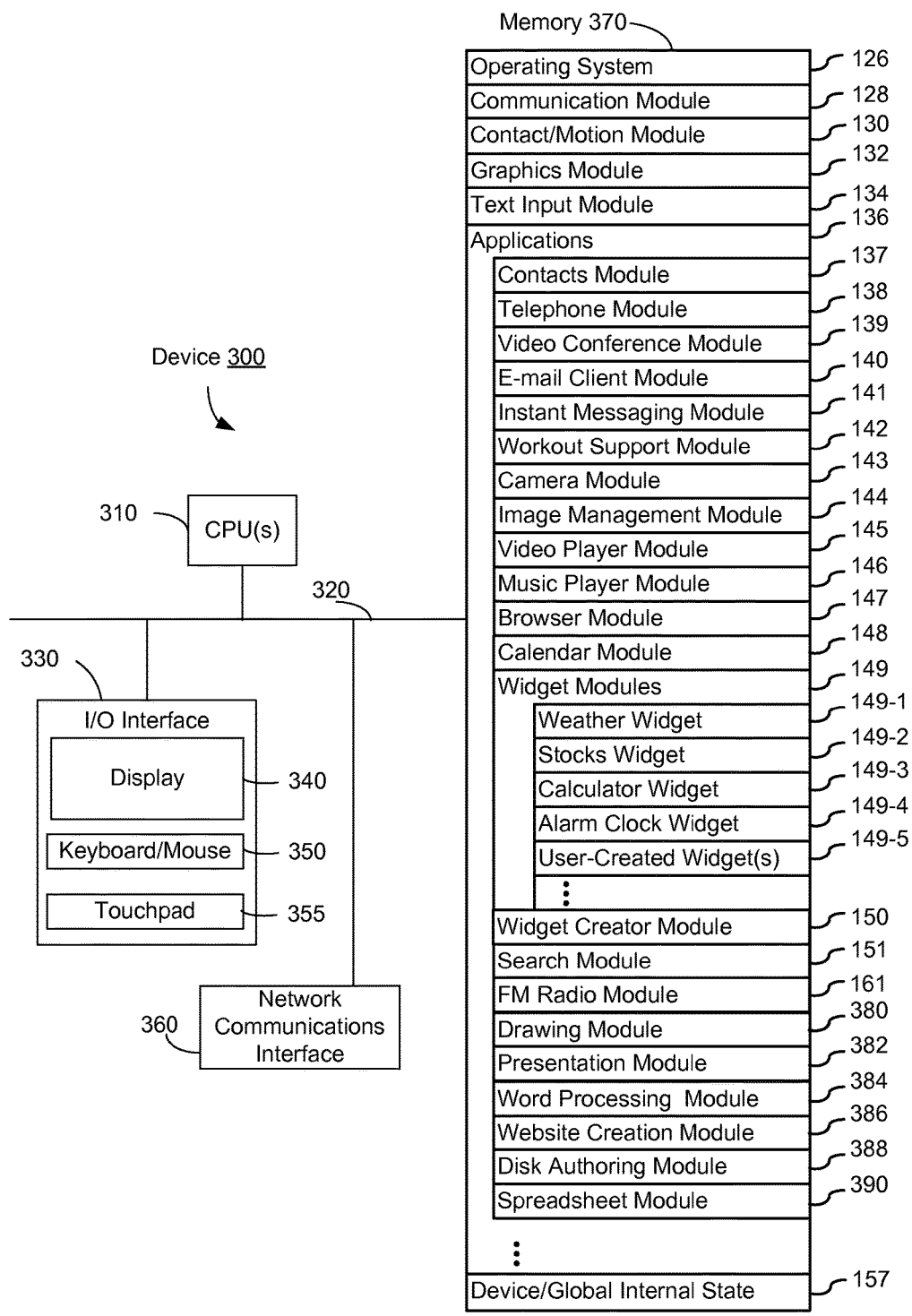
FIG. 3A is a block diagram of an exemplary multifunction device with a display and a touch-sensitive surface in accordance with some embodiments.

FIG. 3A is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3A may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Figure 3B:
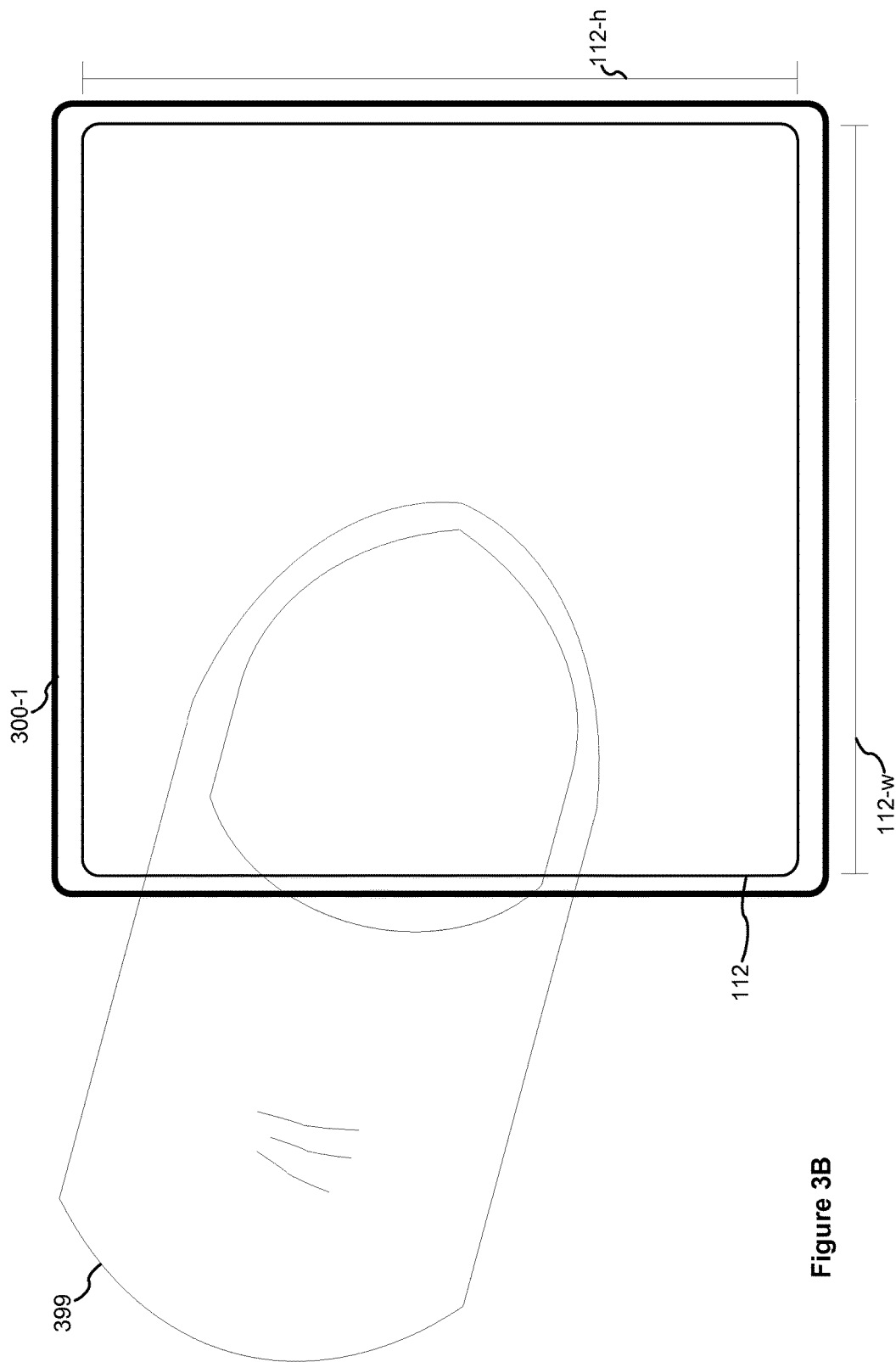
FIG. 3B illustrates an exemplary portable electronic device with a touch-screen in accordance with some embodiments.

Though electronic device 300 is depicted as a multifunction device including I/O interface 330 that incorporates keyboard/mouse 350 and touchpad 355, in some embodiments, electronic device 300-1, as illustrated in FIG. 3B, is a portable electronic device that uses touch-screen 112 without a keyboard, mouse, or independent touchpad. In some embodiments, device 300 is a portable electronic device with touch-screen 112, and is used principally as a portable media player.

For example, portable electronic device 300-1 includes touch-screen 112 with width 112-$w$ and height 112-$h$, which in this example are both 1.1 inches. User's thumb 399, shown superimposed on touch-screen 112, is approximately half the width 112-$w$ or height 112-$h$ of touch-screen 112. In some embodiments, the horizontal dimension of the touch-sensitive display is no greater than 2.0, 1.8, 1.6, 1.4, 1.2, or 1.1 inches. In some embodiments, the vertical dimension of the touch-sensitive display is no greater than 2.0, 1.8, 1.6, 1.4, 1.2, or 1.1 inches.

In some portable media player embodiments, touch-screen 112 may have physical dimensions of 2 inches or less in width and/or height. In some portable media player embodiments, touch-screen 112 may have a screen resolution of 400 pixels or less in width and/or height. In some embodiments, the screen resolution of the touch-sensitive display is no greater than 400, 350, 300 or 250 pixels in width. In some embodiments, the screen resolution of the touch-sensitive display is no greater than 400, 350, 300 or 250 pixels in height.

In some embodiments, memory 370 may store a subset of the modules and data structures identified above. In some portable media player embodiments, electronic device 300-1 may be a smaller physical device, and typically would not include certain of the modules, data structures, and applications identified above that would be used in full-featured portable multifunction devices, e.g., as a portable electronic device 300-1 with touch-screen 112, one or more of the following may not be included: telephone module 138, chart module 144, drawing module 380, presentation module 382, word processing module 384, website creation module 386, and disk authoring module 388.

Attention is now directed towards embodiments of user interfaces ("UI") that may be implemented on portable multifunction device 100.

Figure 4A:
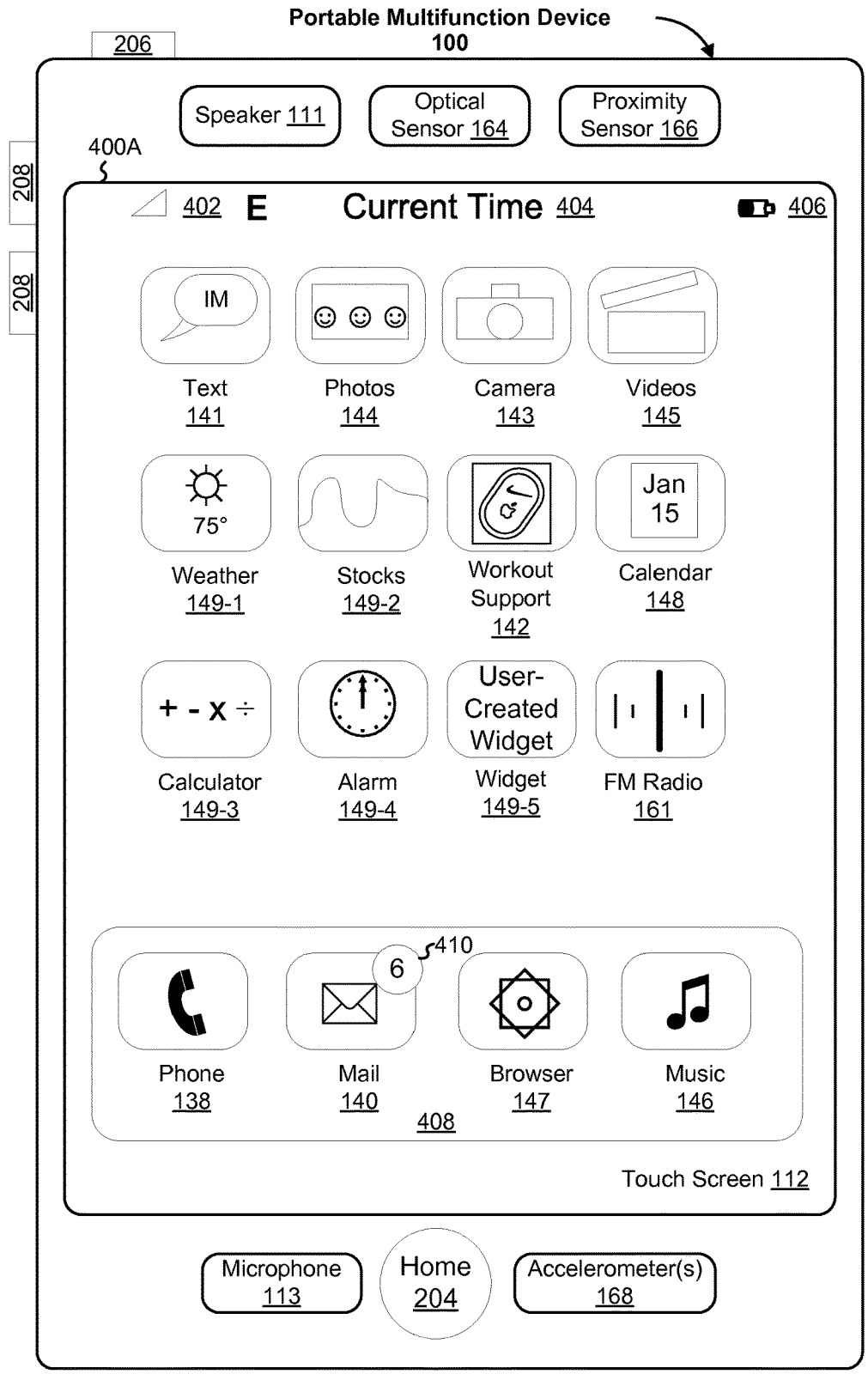
FIGS. 4A and 4B illustrate exemplary user interfaces for a menu of applications on a portable multifunction device in accordance with some embodiments.
Figure 4B:
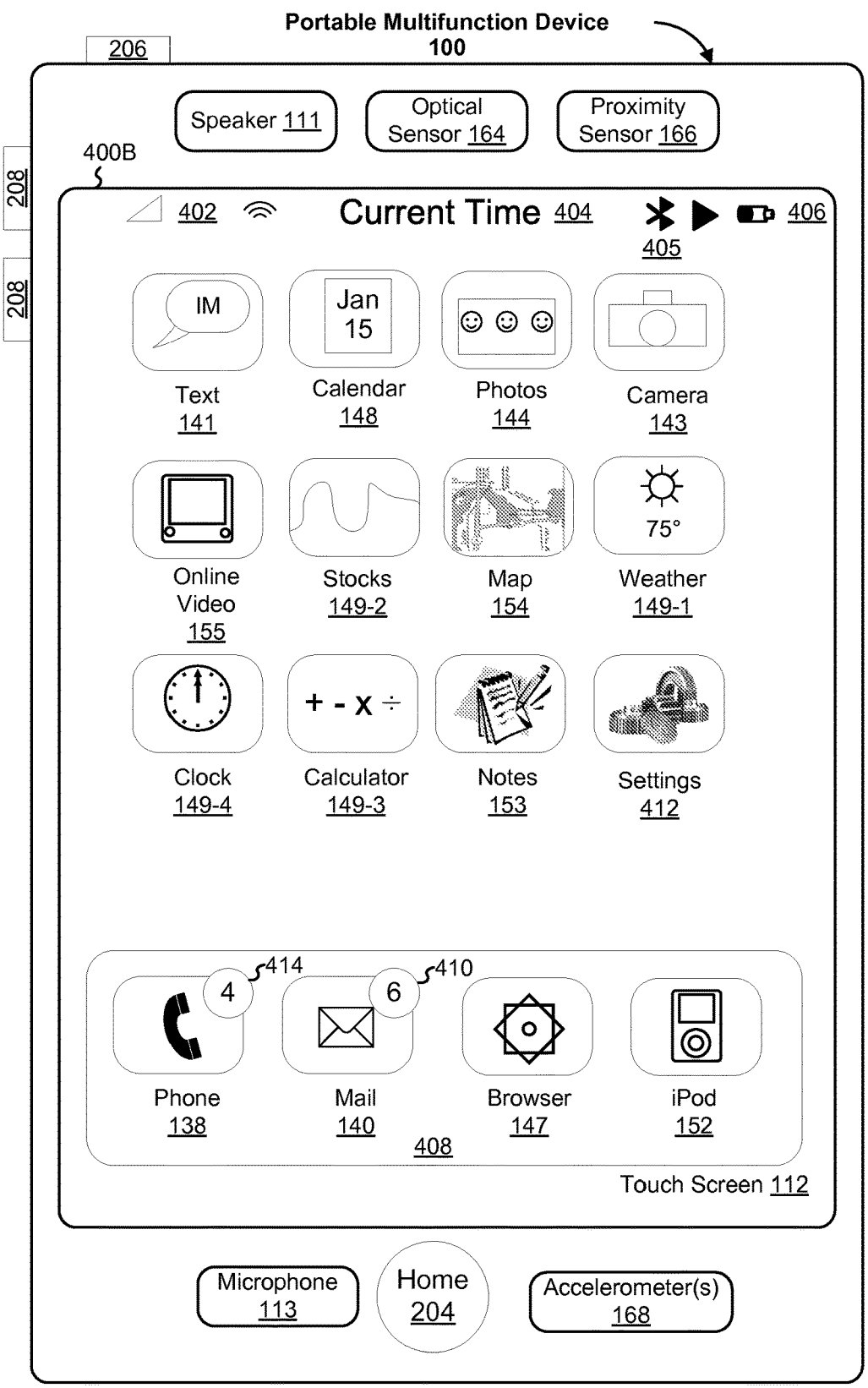

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Workout support 142;
  Calendar 148;
  Calculator 149-3;
  Alarm clock 149-4;
  User-created widget 149-5; and
  FM radio 161

In some embodiments, user interface 400B includes the following elements, or a subset or superset thereof:
  402, 404, 405, 406, 141, 148, 144, 143, 149-3, 149-2, 149-1, 149-4, 410, 414, 138, 140, and 147, as described above;
  Map 154;
  Notes 153;
  Settings 412, which provides access to settings for device 100 and its various applications 136, as described further below;
  Video and music player module 152, also referred to as iPod (trademark of Apple Inc.) module 152; and
  Online video module 155, also referred to as YouTube (trademark of Google Inc.) module 155.

Figure 4C:
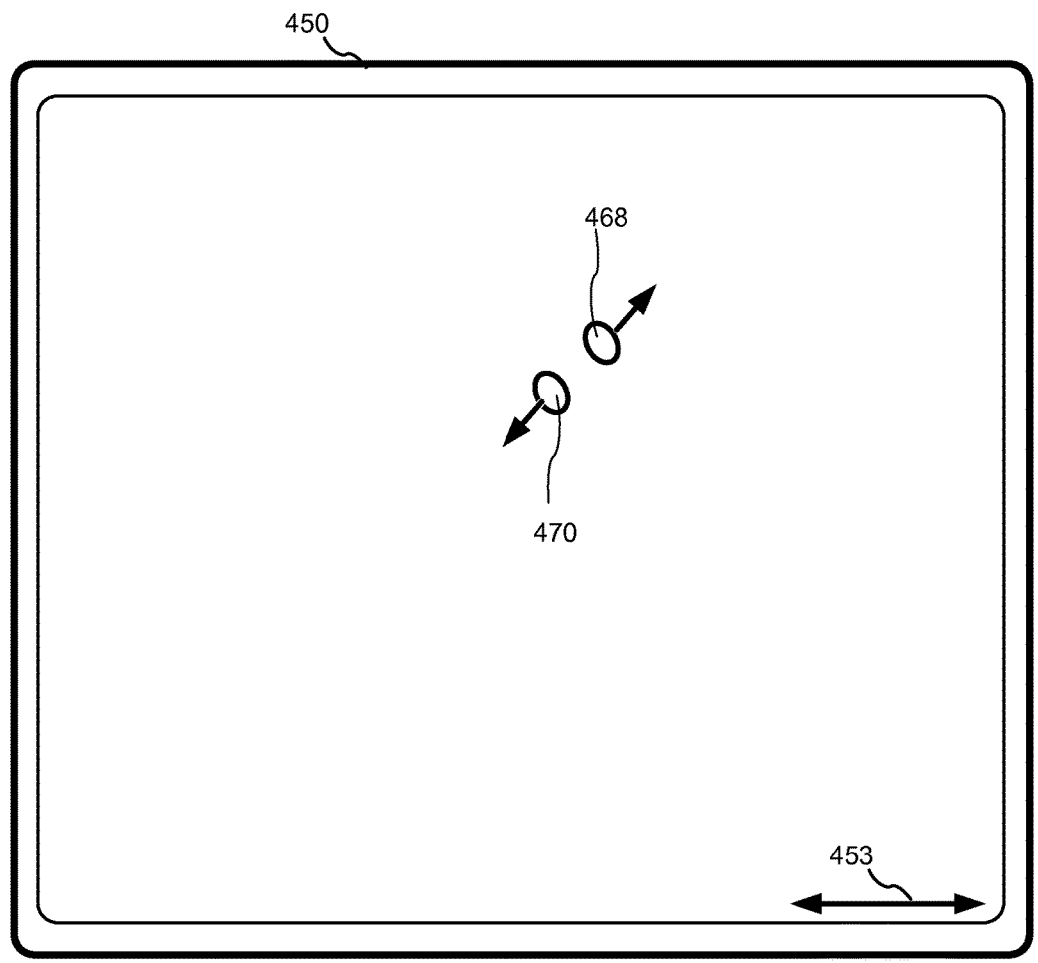
FIG. 4C illustrates an exemplary user interface for a multifunction device with a touch-sensitive surface that is separate from the display in accordance with some embodiments.
Figure 4C:
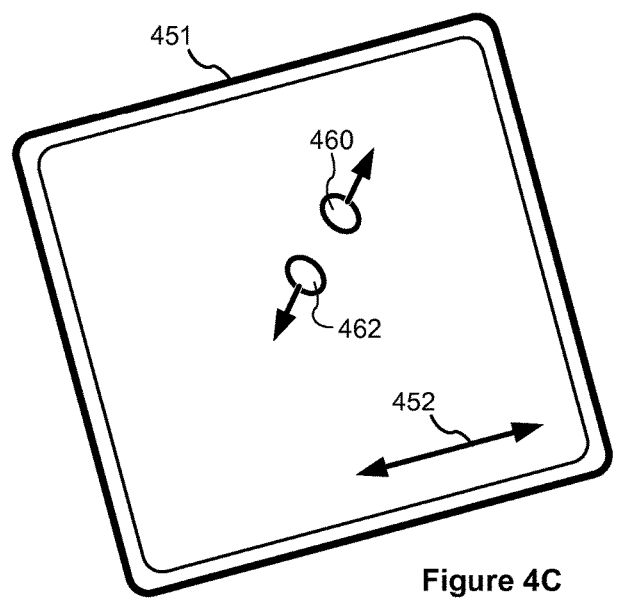

FIG. 4C illustrates an exemplary user interface on a device (e.g., device 300, FIG. 3A) with a touch-sensitive surface 451 (e.g., a tablet or touchpad 355, FIG. 3A) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462, and movements thereof) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

User Interfaces and Associated Processes

Attention is now directed towards embodiments of user interfaces ("UI") and associated processes that may be implemented on a multifunction device with a display and a touch-sensitive surface, such as device 300, device 300-1, or portable multifunction device 100.

Figure 5A:
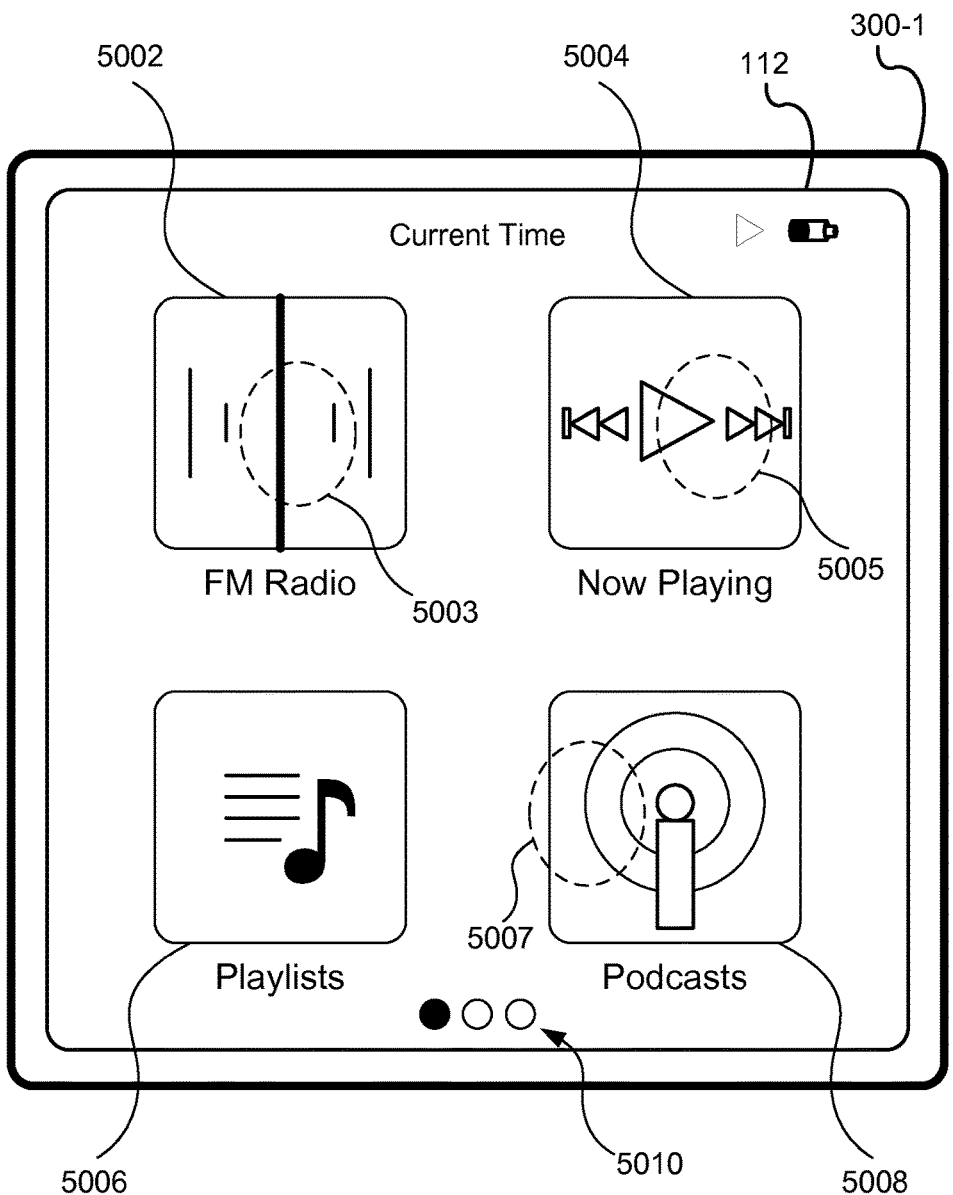
FIGS. 5A-5O illustrate exemplary user interfaces for selecting and using media player controls in accordance with some embodiments.
Figure 5B:
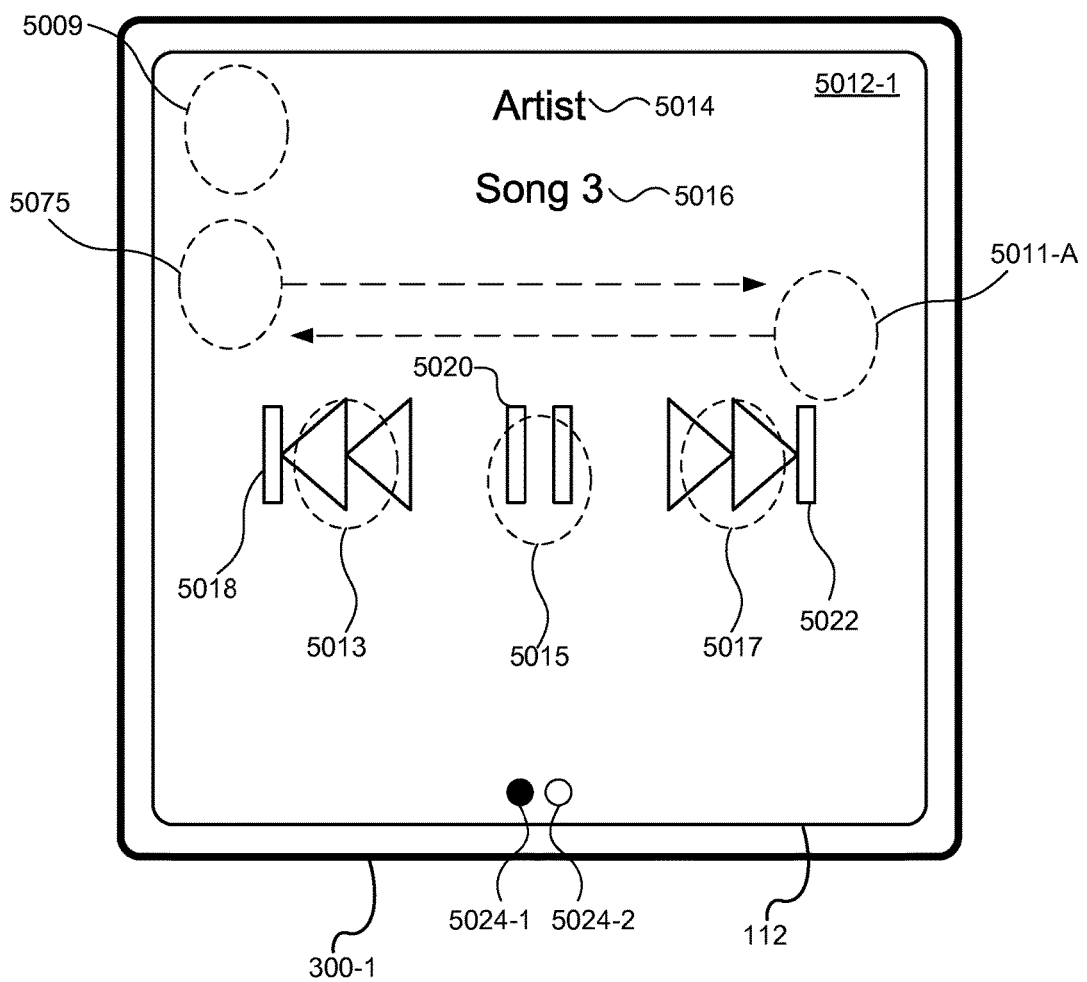
Figure 5C:
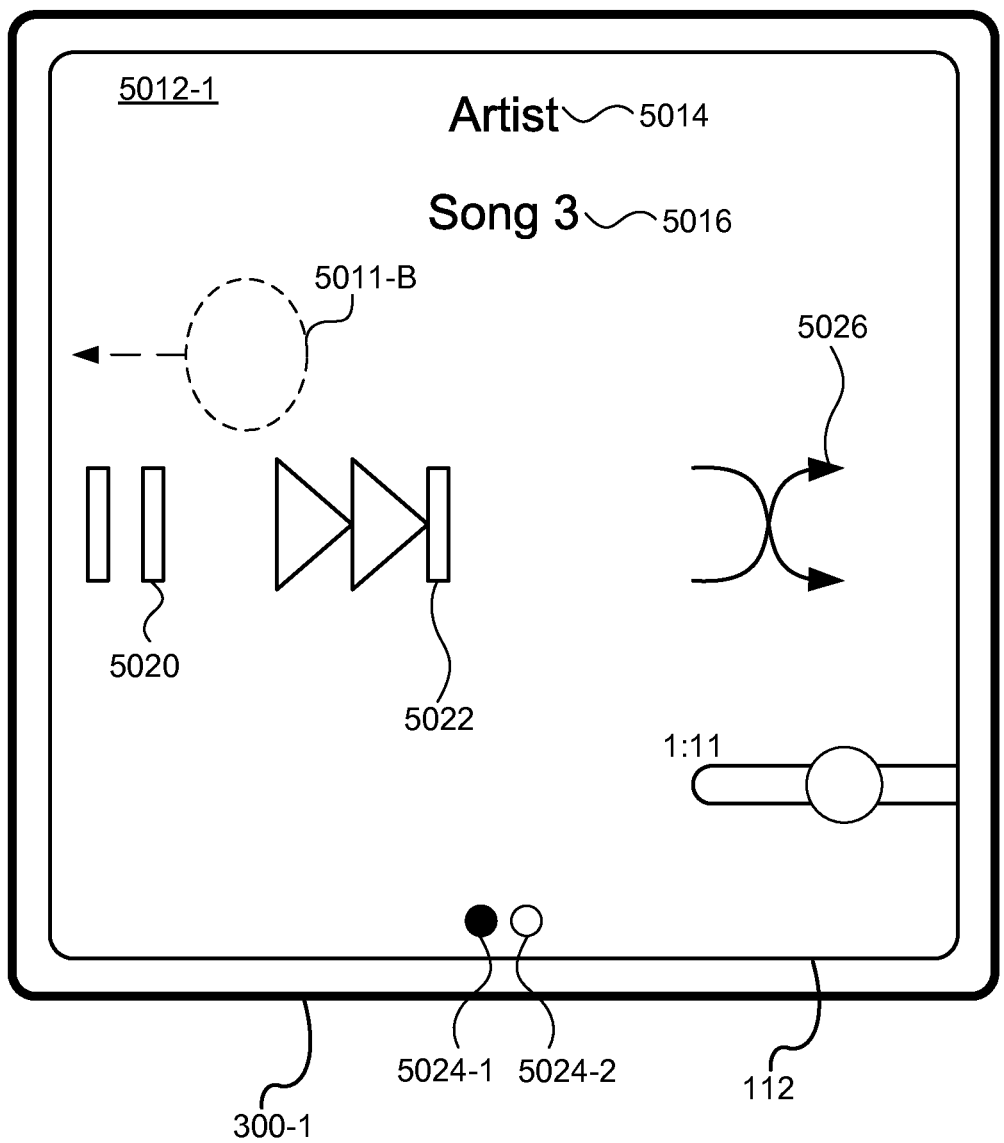
Figure 5D:
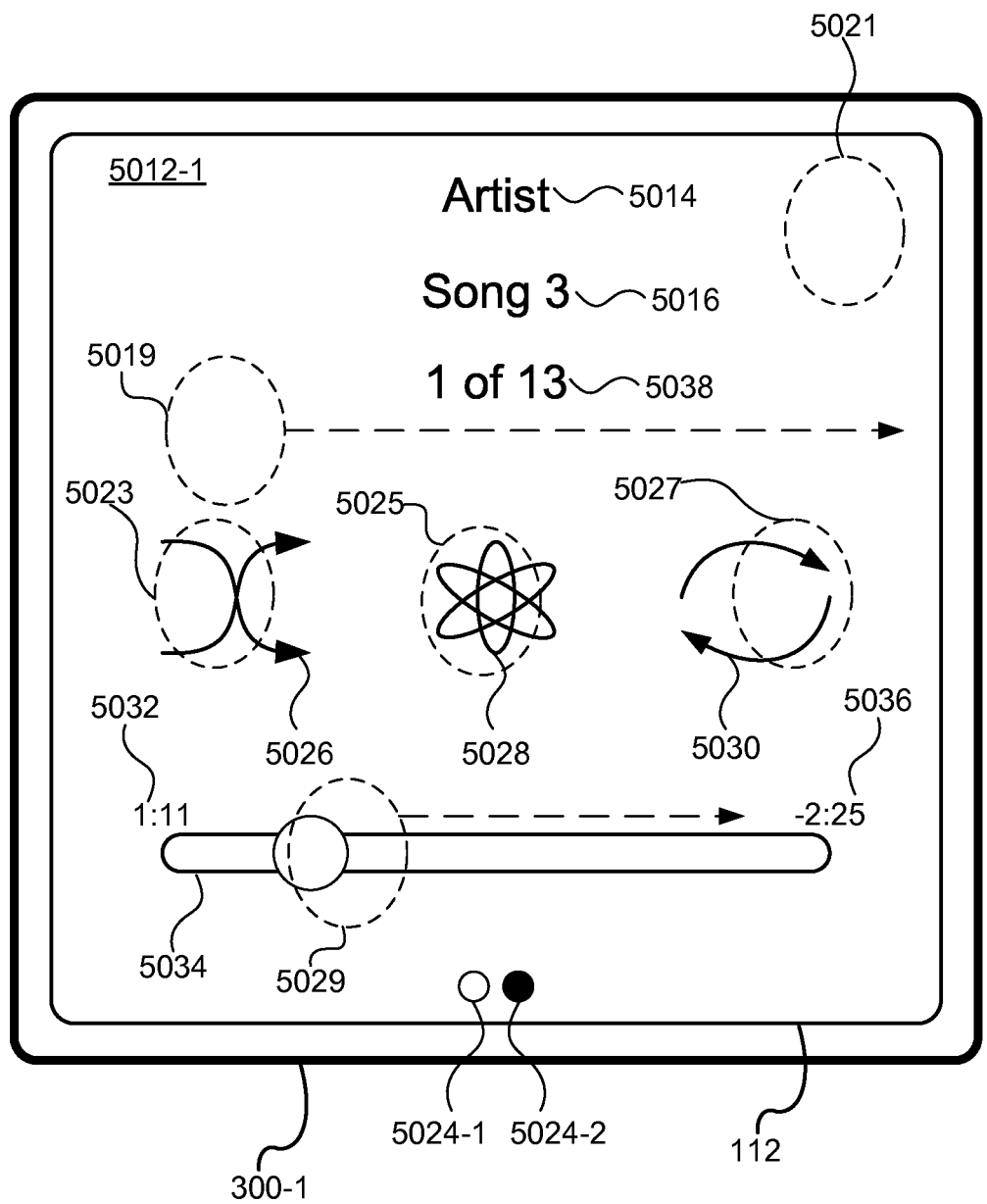
Figure 5E:
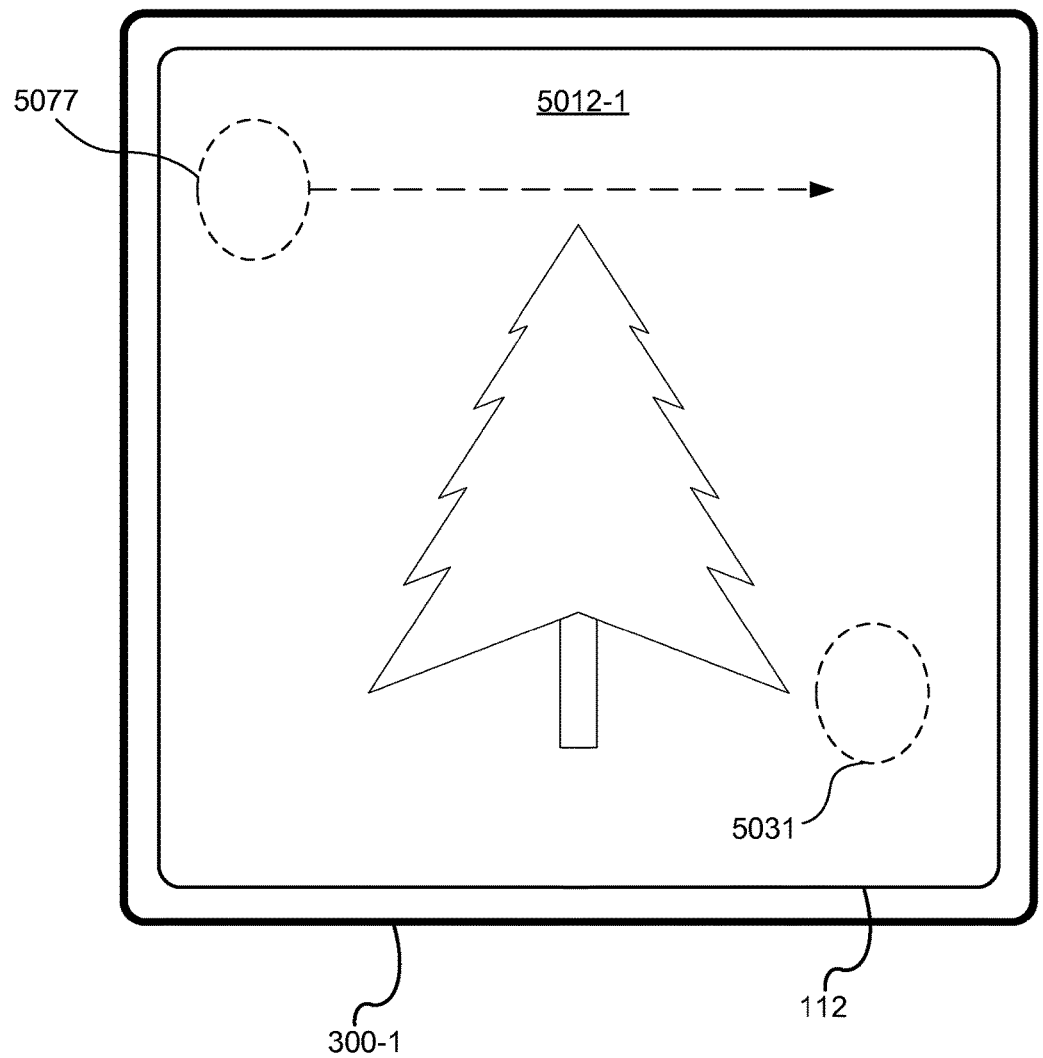
Figure 5F:
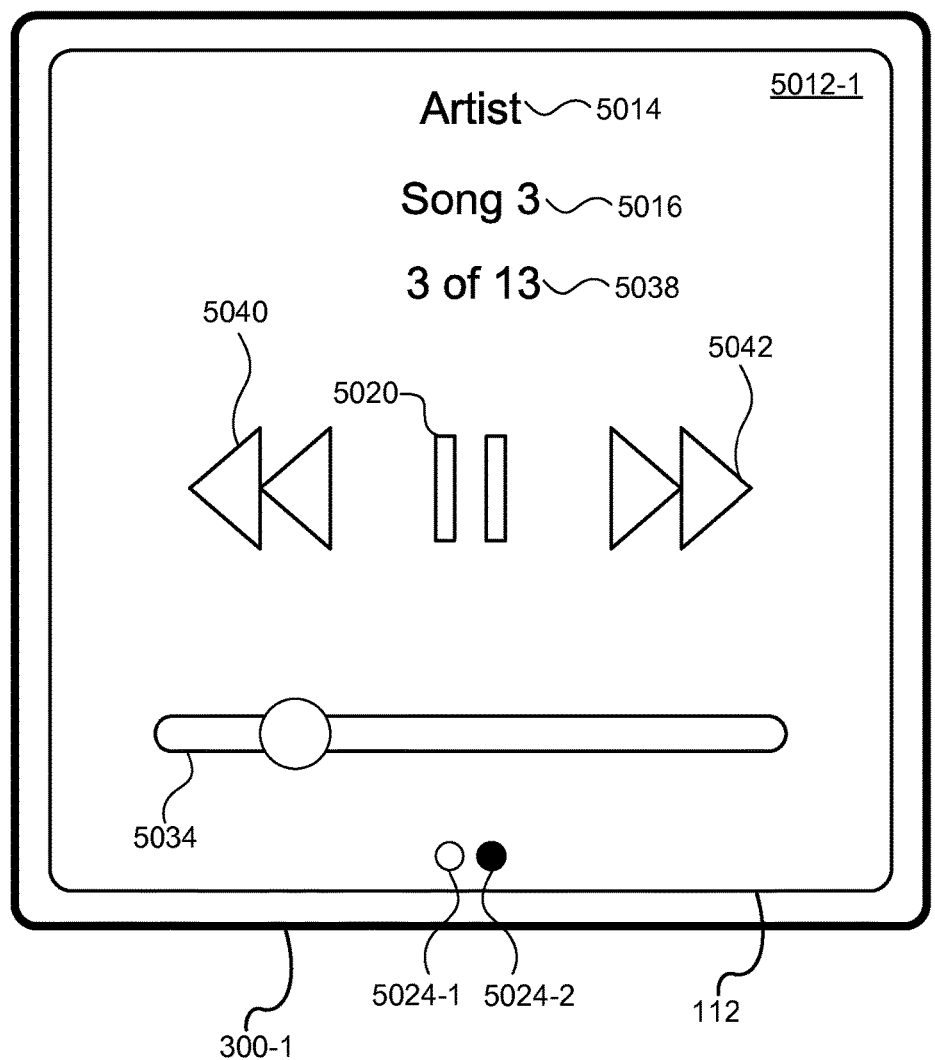
Figure 5G:
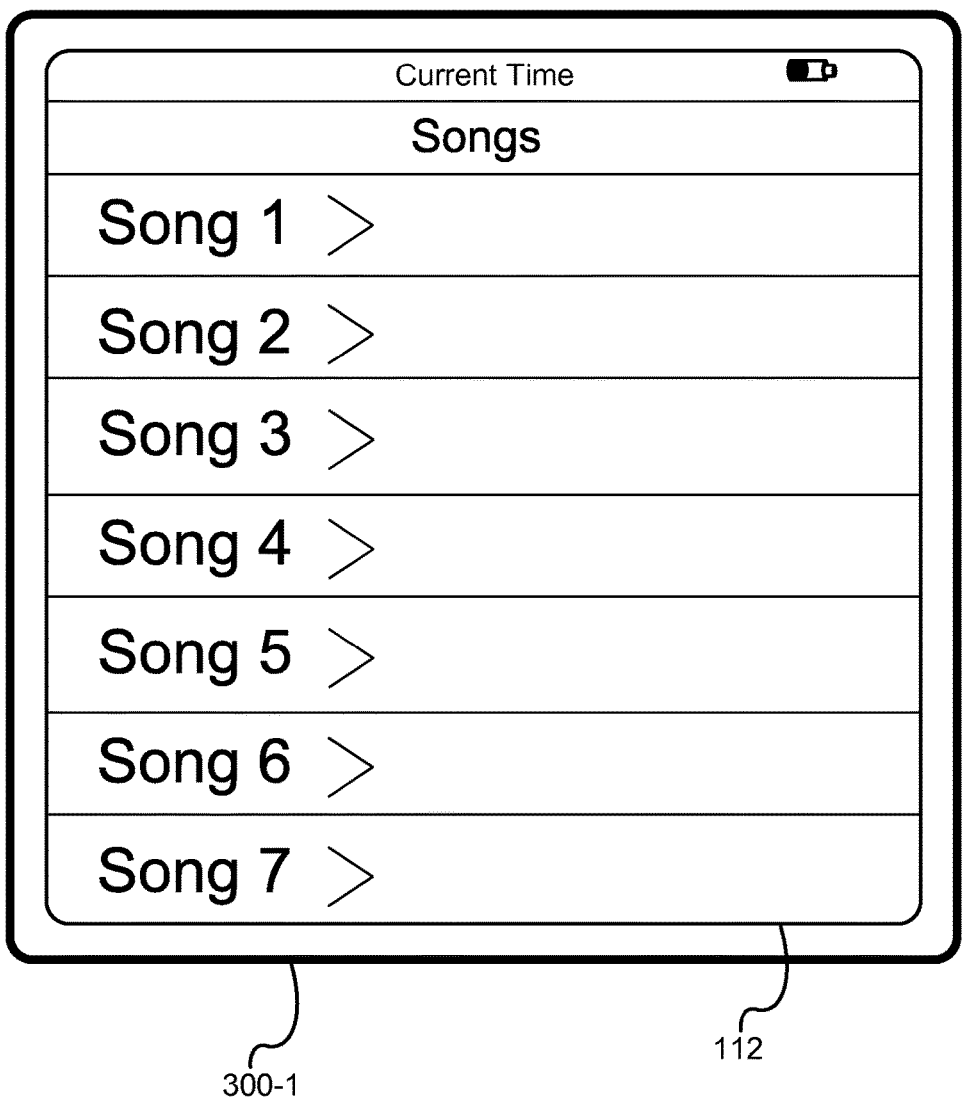
Figure 5H:
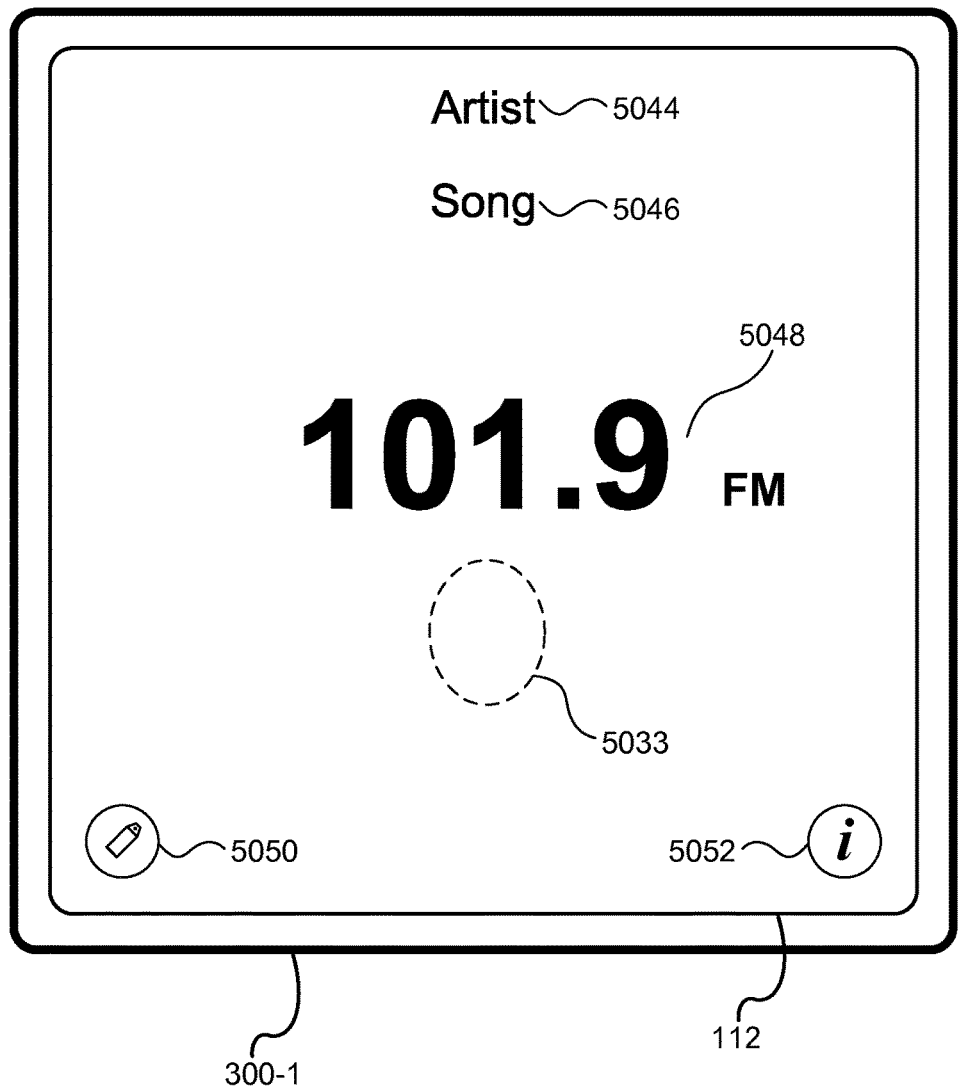
Figure 5I:
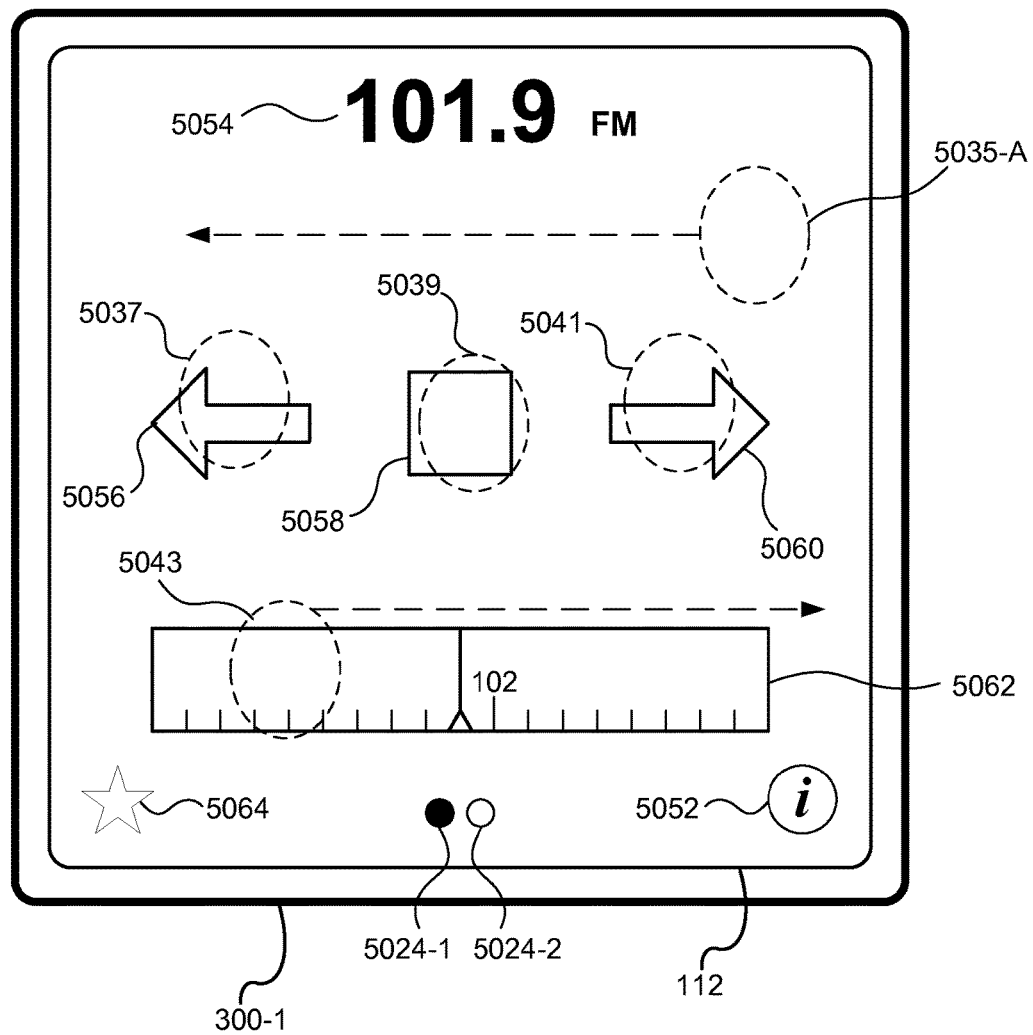
Figure 5J:
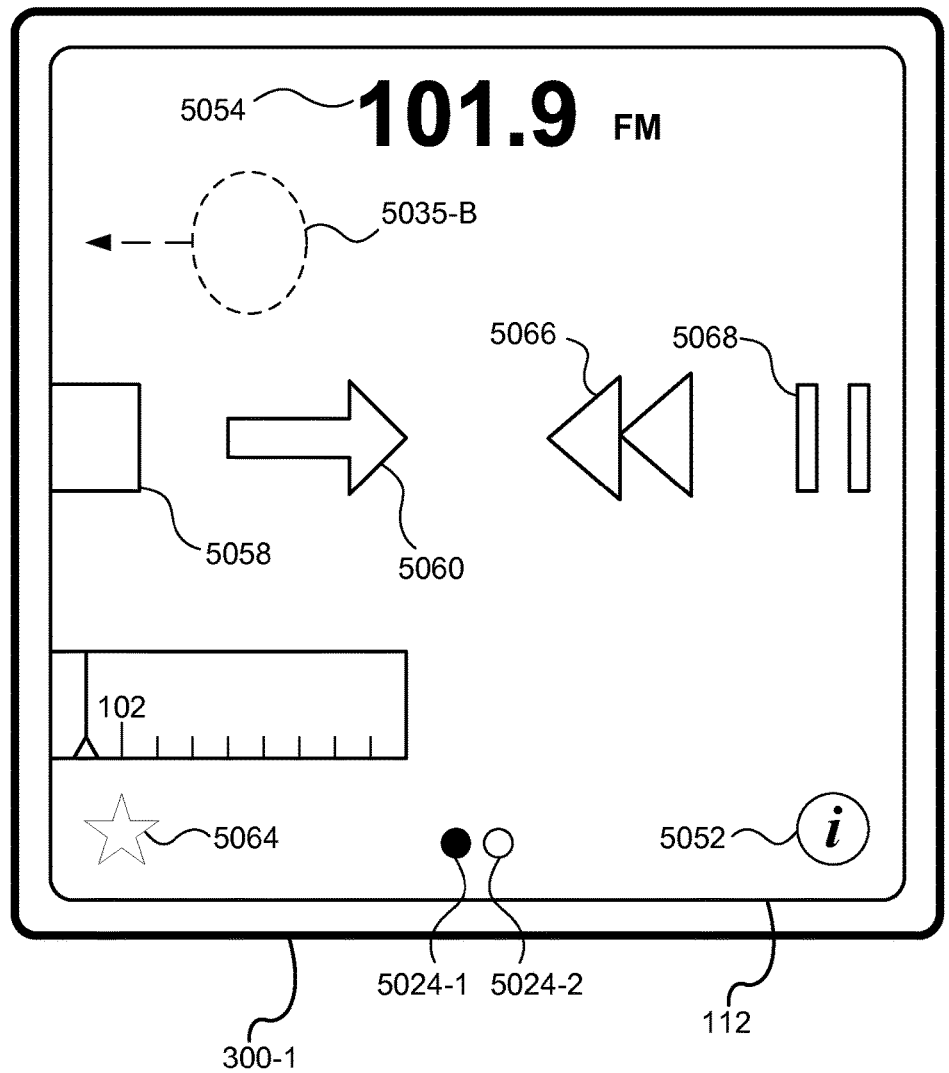
Figure 5K:
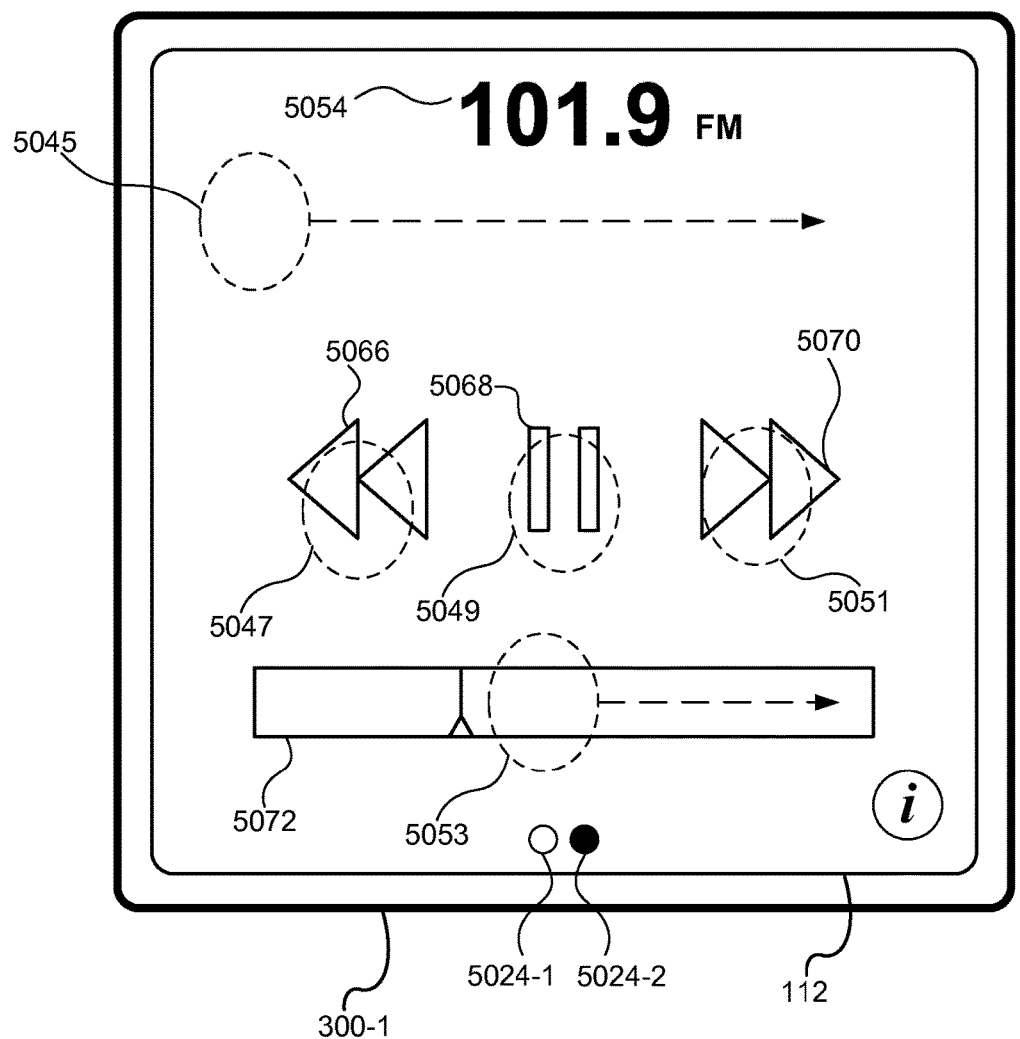
Figure 5L:
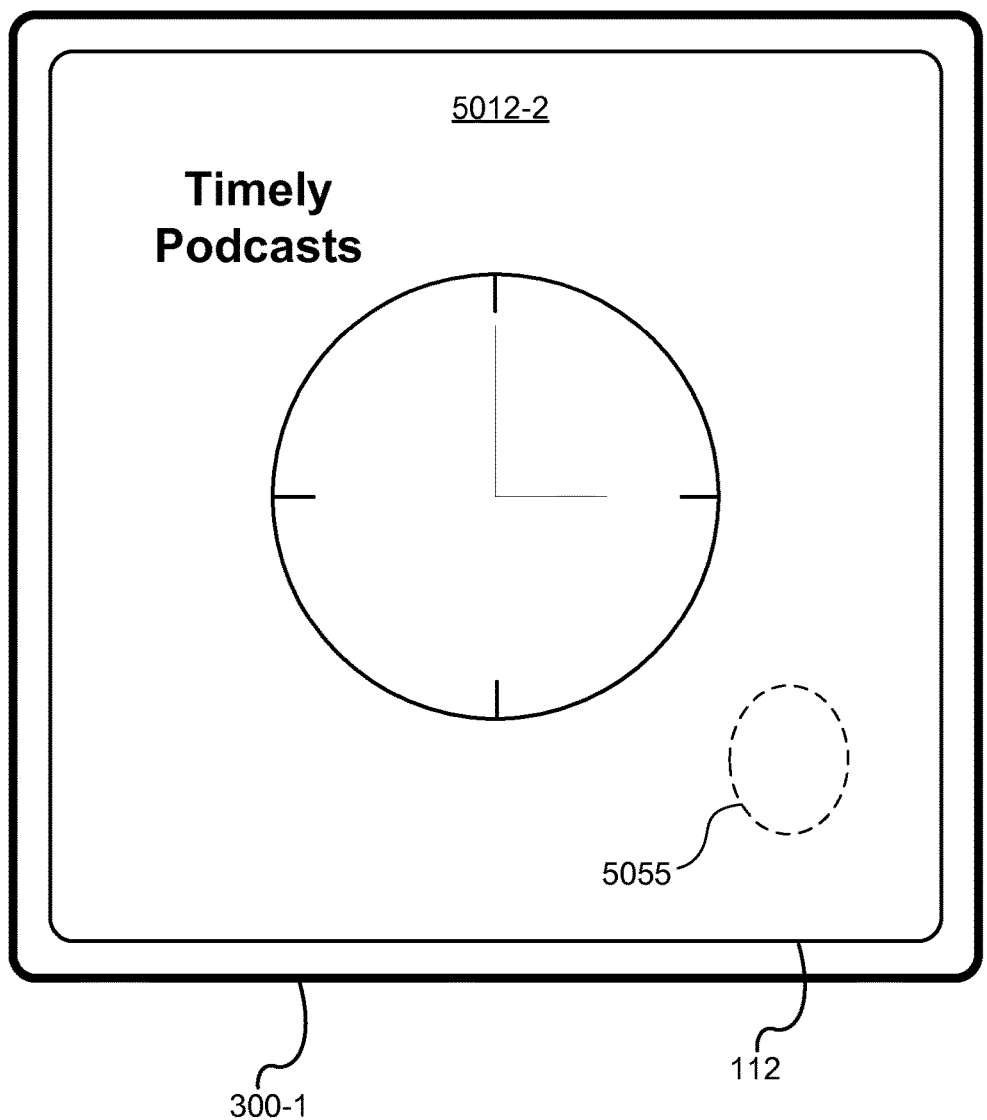
Figure 5M:
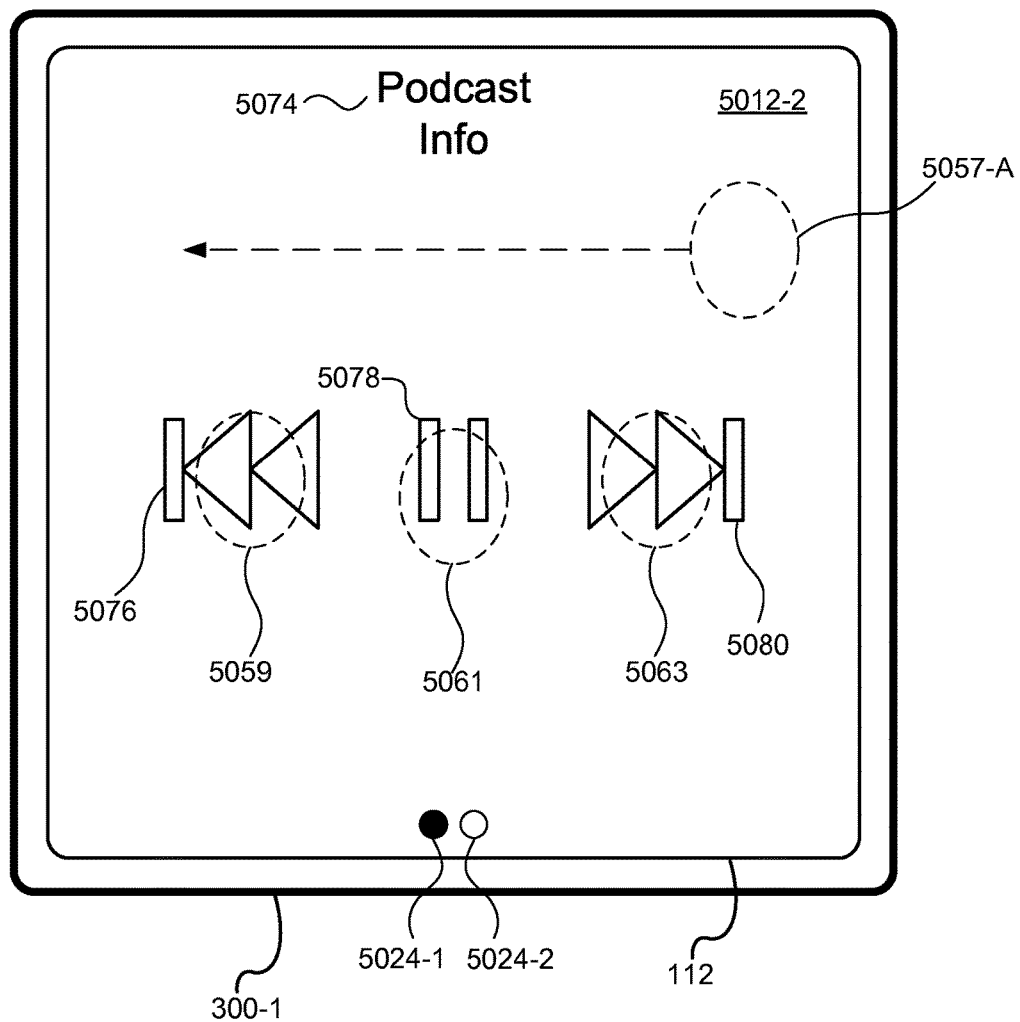
Figure 5N:
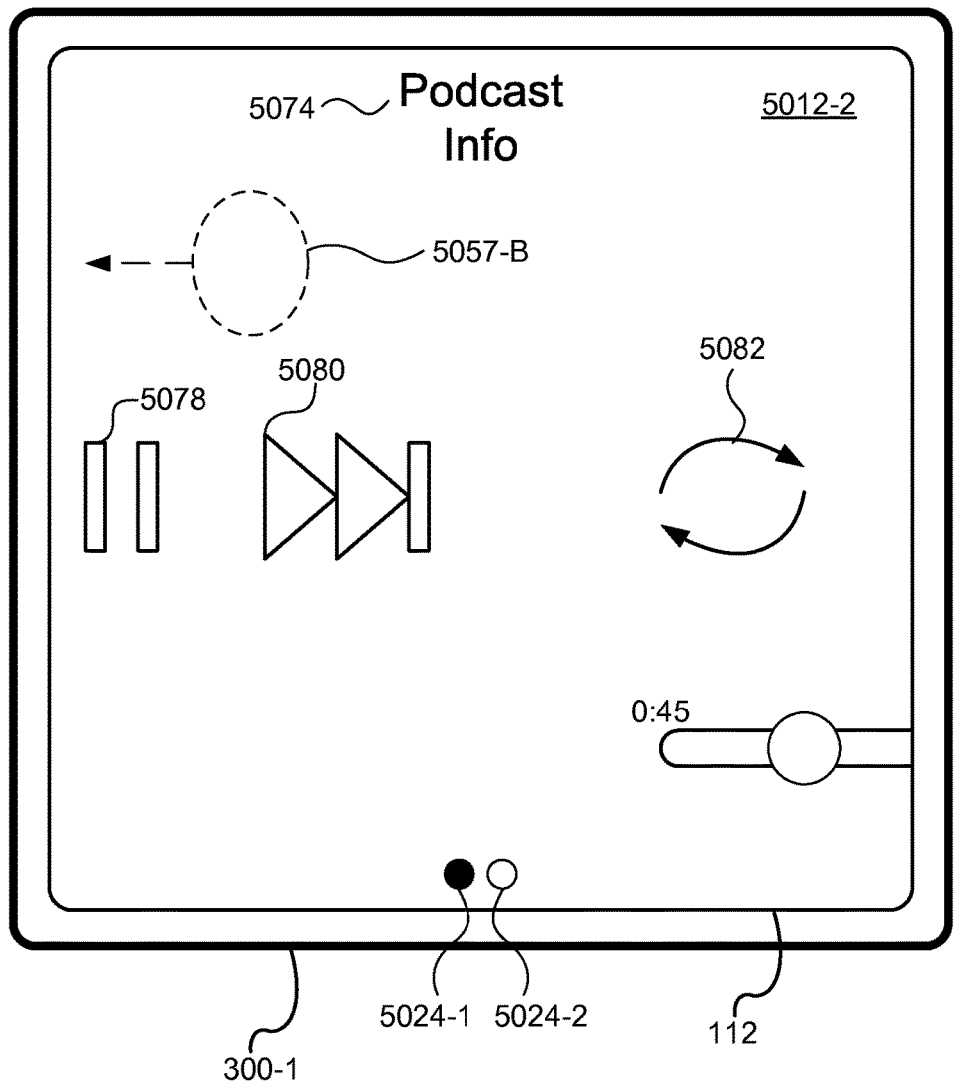
Figure 5O:
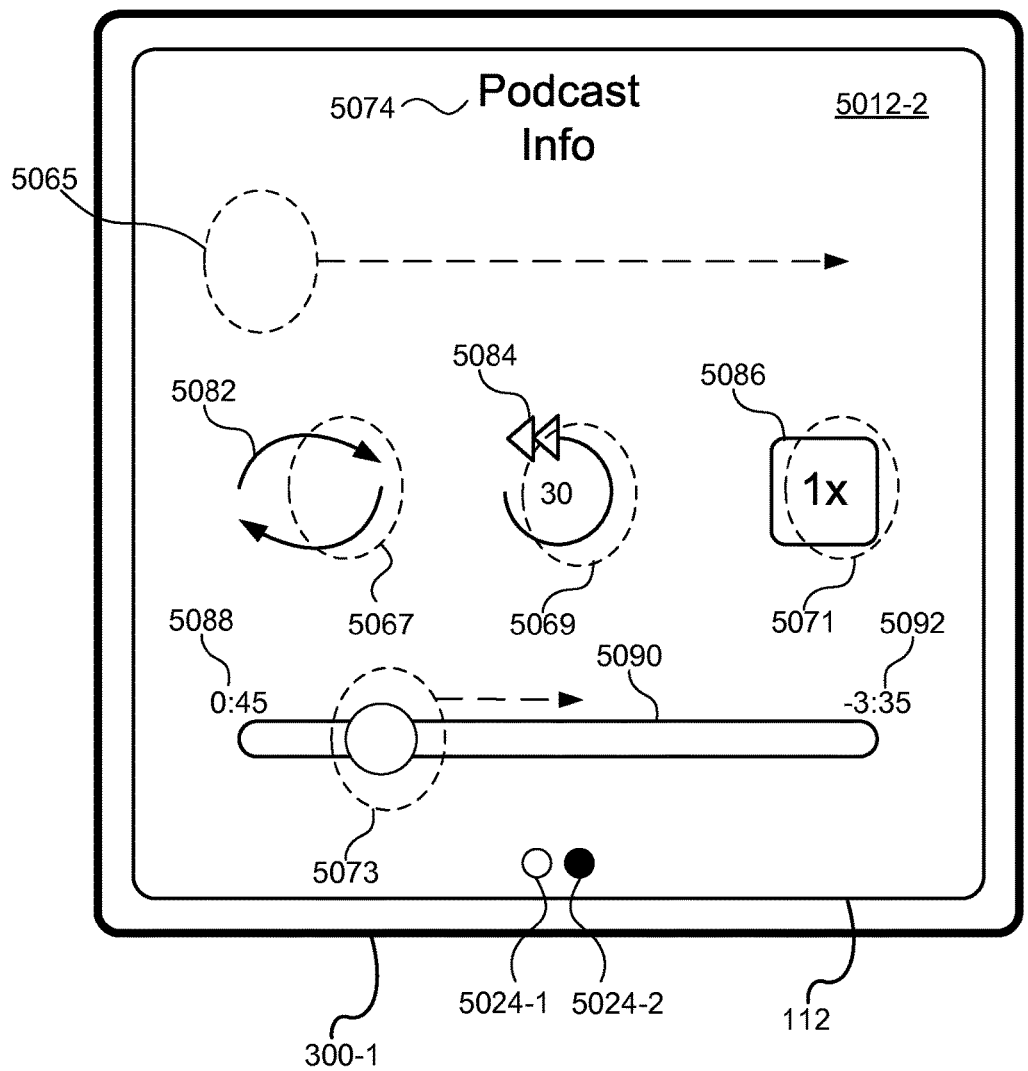
Figure 6A:
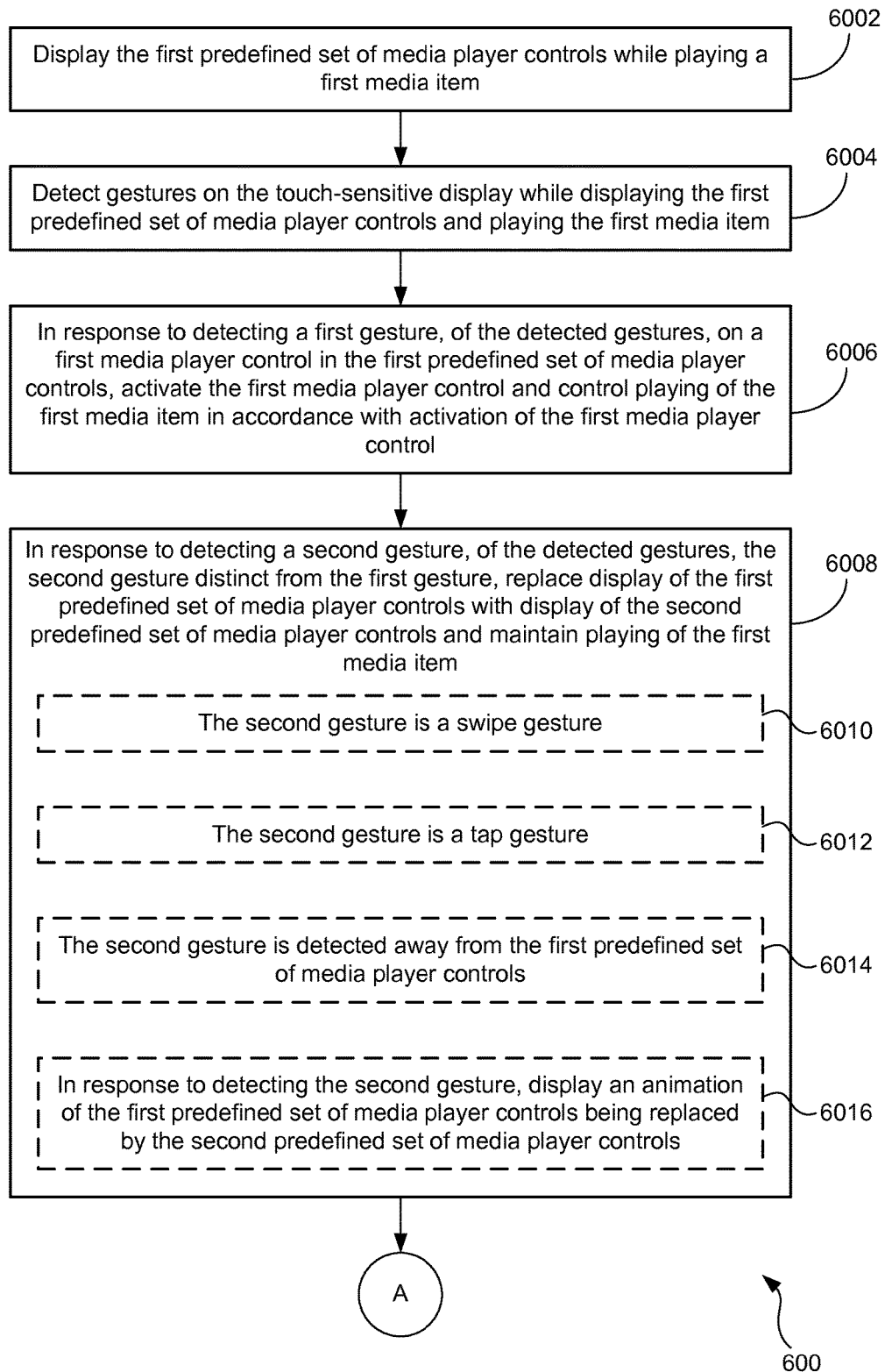
FIGS. 6A-6D are flow diagrams illustrating a method of selecting and using media player controls in accordance with some embodiments.
Figure 6B:
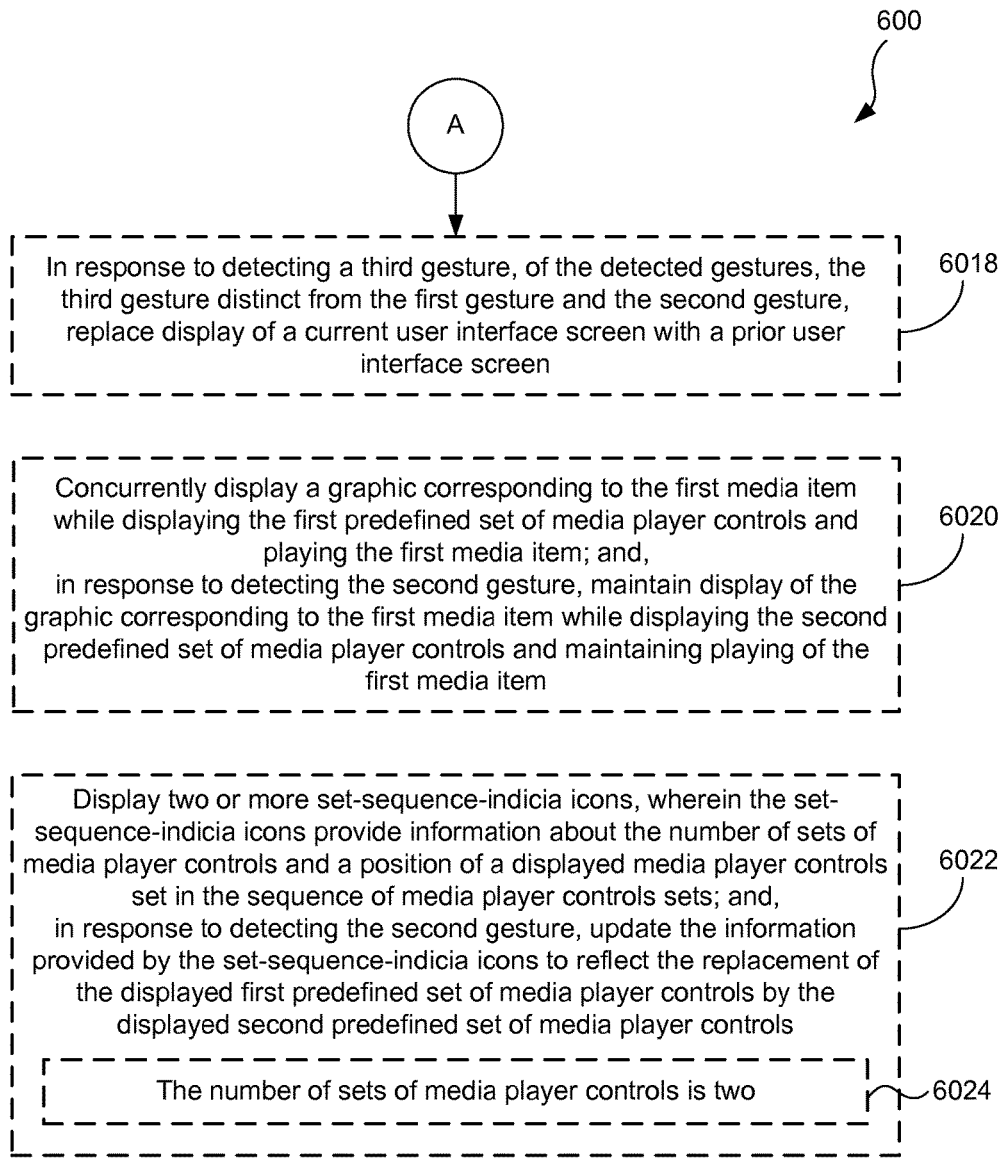
Figure 6C:
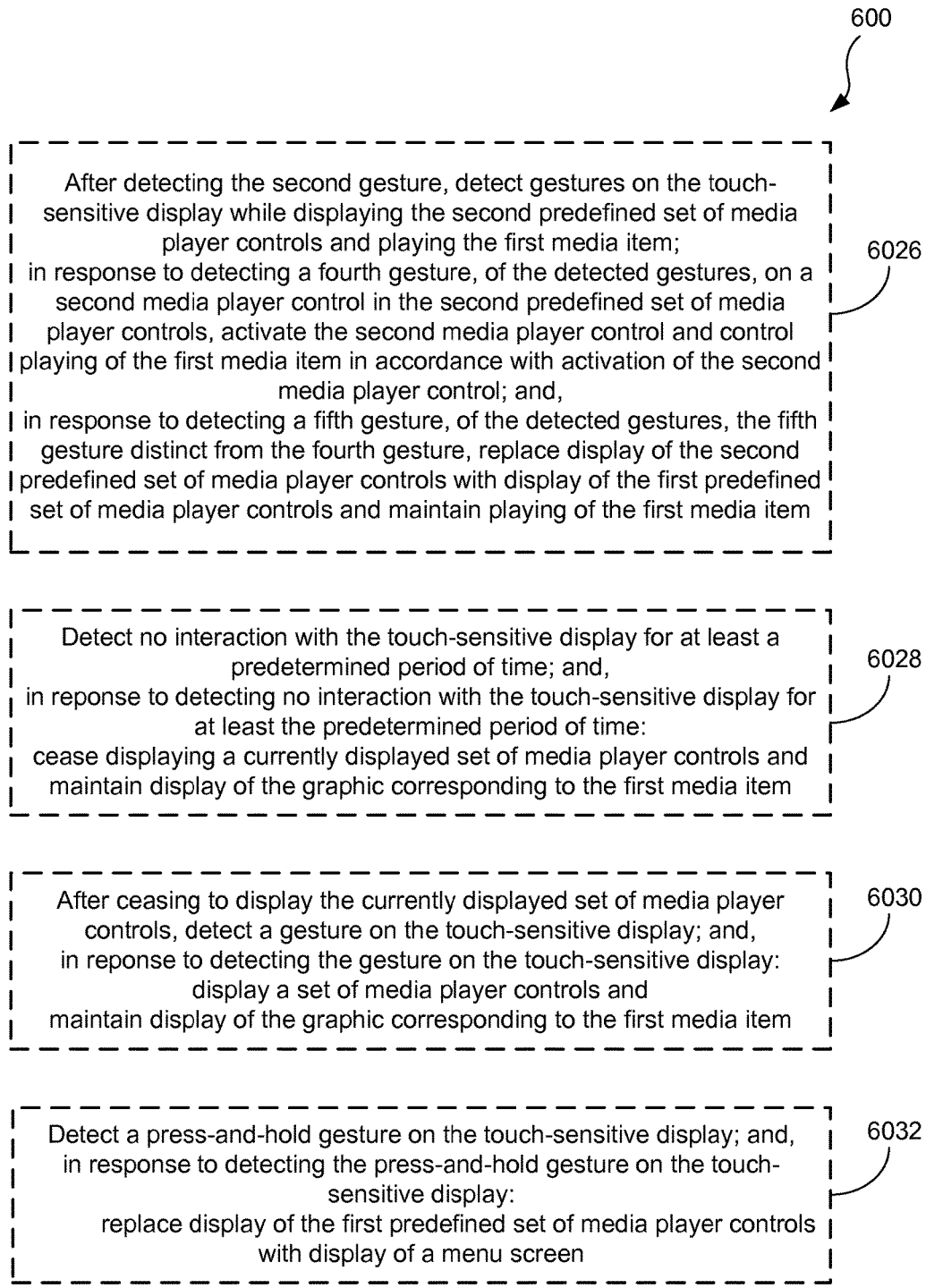
Figure 6D:
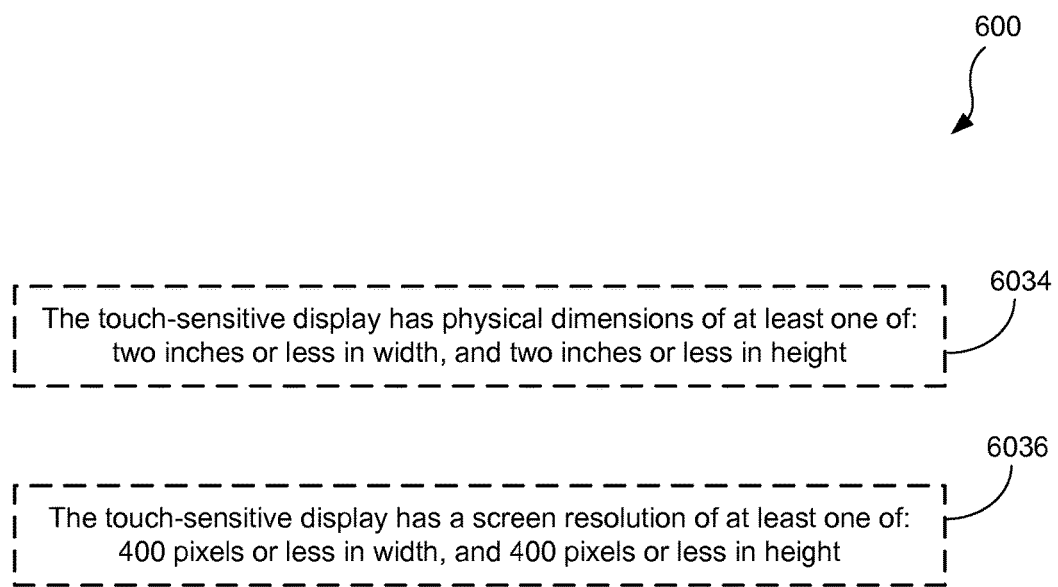

FIGS. 5A-5O illustrate exemplary user interfaces for selecting and using media player controls in accordance with some embodiments. The user interfaces in these figures are used to illustrate the processes described below, including the processes in FIGS. 6A-6D. It should be appreciated that FIGS. 5A-5O are not drawn to scale.

FIG. 5A depicts on the touch sensitive display 112 a menu screen with an application launch icon 5002 (for FM radio 161) and shortcut icons 5004, 5006, and 5008 to predefined user interface screens in a media player application (e.g., music player 146). In response to detecting a gesture on application launch icon 5002 (e.g., finger tap gesture 5003), the device launches the FM radio application (if the application is not already running) and displays a user interface screen in the FM radio application (e.g., FIG. 5H).

In response to detecting a gesture on Now Playing shortcut icon 5004 (e.g., finger tap gesture 5005), the device launches the music player application (if the application is not already running) and displays a user interface screen in the music application (e.g., FIG. 5B). In response to detecting a gesture on Playlists shortcut icon 5006 (e.g., a finger tap gesture), the device launches the music player application (if the application is not already running) and displays a Playlists user interface screen in the music application (not shown). In response to detecting a gesture on Podcasts shortcut icon 5008 (e.g., finger tap gesture 5007), the device launches the music player application (if the application is not already running) and displays a Podcasts user interface screen in the music application (e.g., FIG. 5L).

The menu screen in FIG. 5A includes menu screen set-sequence-indicia icons 5010. The menu screen set-sequence-indicia icons provide information about the number of menu screens and the position of a displayed menu screen in a sequence of menu screens. In this example, there are three menu screens and the first menu screen is being displayed.

FIGS. 5B-5G illustrate selecting and using media player controls while a song is playing in a music application.

FIG. 5E illustrates a graphic 5012-1 that corresponds to a currently playing piece of music (e.g. a tree on an album cover for an album that contains the piece of music). Graphic 5012-1 is typically displayed in the background while the music player controls are displayed for the currently playing piece of music, as indicated by the "5012-1" shown in FIGS. 5B-5D and 5F. Graphic 5012-1 provides context to the user, but the tree graphic 5012-1 is not shown in FIGS. 5B-5D and 5F for clarity.

FIG. 5B displays information about a currently playing media item (e.g., artist 5014, title 'Song 3' 5016, and graphic 5012-1), as well as a first set of media player controls (e.g., previous song icon 5018, play/pause toggle icon 5020, and next song icon 5022).

In response to detecting a gesture on previous song icon 5018 (e.g., finger tap gesture 5013), the device restarts the currently playing song from its beginning or starts playing a previous song in a playlist, depending on how long the current song has been playing. In response to detecting a gesture on play/pause toggle icon 5020 (e.g., finger tap gesture 5015), the device toggles the currently playing song between play and pause. In response to detecting a gesture on next song icon 5022 (e.g., finger tap gesture 5017), the device starts playing a next song in a playlist.

On the other hand, in response to detecting a gesture that is distinct from the gestures 5013, 5015, and 5017 on respective media player controls, the device replaces display of the first predefined set of media player controls (e.g., 5018, 5020, and 5022, FIG. 5B) with display of a second predefined set of media player controls (e.g., 5026, 5028, 5030, and 5034, FIG. 5D) and maintains playing of the first media item (e.g., the currently playing song). Exemplary gestures include a right-to-left swipe gesture made with finger contact 5011, or a tap gesture 5009 that is detected away from the first predefined set of media player controls.

FIG. 5B includes media player control set-sequence-indicia icons 5024. The media player control set-sequence-indicia icons provide information about the number of sets of media player controls and a position of a displayed media player controls set in the sequence of media player controls sets. In this example, there are two sets of media player controls and the first set of media player controls is being displayed.

In some embodiments, when the first set of media player controls is displayed, in response to detecting a left-to-right swipe gesture (e.g., made with finger contact 5075, FIG. 5B), the device will replace display of the current user interface screen (e.g., FIG. 5B) with a prior user interface screen (e.g., a playlist from which the currently playing song ('Song 3') was selected, as shown in FIG. 5G).

FIG. 5C illustrates an animation that may be displayed as the device replaces display of the first predefined set of media player controls (e.g., 5018, 5020, and 5022, FIG. 5B) with display of a second predefined set of media player controls (e.g., 5026, 5028, and 5030, FIG. 5D).

FIG. 5D displays information about the currently playing media item (e.g., artist 5014, title 'Song 3' 5016, graphic 5012-1, and position in playlist 5038), as well as a second set of media player controls (e.g., shuffle icon 5026, genius icon 5028, repeat icon 5030, and playback progress slider 5034 that shows the current location 5032 in the song and remaining time 5036). The media player control set-sequence-indicia icons 5024 in FIG. 5D indicate that the second of two sets of media player controls is being displayed.

In response to detecting a gesture on shuffle icon 5026 (e.g., finger tap gesture 5023), the device selects music to play from the current playlist at random. In response to detecting a gesture on genius icon 5028 (e.g., finger tap gesture 5025), the device creates a new playlist based on the currently playing song and then plays the new playlist. In response to detecting a gesture on repeat icon 5030 (e.g., finger tap gesture 5027), the device toggles among three states: repeating the current playlist, repeating the current song, and not repeating either the current playlist or the current song. In response to detecting a gesture on playback progress slider 5034 (e.g., a drag gesture with finger contact 5029), the device modifies the playback position in the currently playing song.

On the other hand, in response to detecting a gesture that is distinct from the gestures 5023, 5025, 5027, and 5029 on respective media player controls, the device replaces display of the second predefined set of media player controls (e.g., 5026, 5028, 5030, and 5034, FIG. 5D) with display of the first predefined set of media player controls (e.g., 5018, 5020, and 5022, FIG. 5B) and maintains playing of the first media item (e.g., the currently playing song). Exemplary gestures include a left-to-right swipe gesture made with finger contact 5019, or a tap gesture 5021 that is detected away from the second predefined set of media player controls.

As noted above, FIG. 5E illustrates a graphic 5012-1 that corresponds to a currently playing piece of music (e.g. a tree on an album cover for an album that contains the piece of music). In some embodiments, the currently displayed set of music player controls fade out and leave just the graphic 5012-1 when no input is received by the touch-sensitive display for a predetermined time period. In some embodiments, in response to detecting a press-and-hold gesture on any user interface screen (e.g., a press-and-hold gesture made with finger contact 5031, FIG. 5E), the device returns to a menu screen (e.g., FIG. 5A). Thus, in a small portable electronic device with little or no room for either a physical or virtual menu button, the press-and-hold gesture takes the place of the physical or virtual menu button. Also shown in FIG. 5E is a left-to-right swipe gesture made with finger contact 5077, which typically replaces the current user interface screen with a prior user interface screen (e.g., the playlist from which the currently playing song ('Song 3') was selected, FIG. 5G).

FIG. 5F shows an alternative second set of music player controls: reverse icon 5040, play/pause toggle icon 5020, forward icon 5042, and playback progress slider 5034. In response to detecting a gesture on reverse icon 5040 (e.g., a finger gesture), the device rewinds within the currently playing song. In response to detecting a gesture on forward icon 5042 (e.g., a finger gesture), the device fast forwards within the currently playing song. Media player controls 5020 and 5034 perform as previously described above. In some embodiments, the sets of media player controls may be tailored to the particular application, either by the application designer or by an end user (e.g., via preference settings or a reconfiguration mode).

FIGS. 5H-5K illustrate selecting and using media player controls in an FM radio application.

FIG. 5H displays information about a currently playing media item (e.g., artist 5044, and song title 5046) at a particular radio station 5048.

In response to detecting a gesture on information icon 5052 (e.g., a finger tap gesture), the device displays a list of options for the FM radio application (e.g., local stations, favorite stations, tagged songs, and/or recent songs, not shown). An icon 5050 that indicates that radio station 5048 provides metadata for its music (or other content) may also be shown.

In response to detecting a gesture on the touch sensitive display 112 (e.g., finger tap gesture 5033), the device displays a first set of media player controls for the radio (e.g., previous favorite station 5056, stop/play toggle icon 5058, next favorite station 5060, and station tuner/selector 5062, as shown in FIG. 5I), as well as a smaller label 5054 for the radio station, an indicator 5064 that the radio station is in the list of favorite radio stations for the user, information icon 5052, and media player control set-sequence-indicia icons 5024 for the two sets of media player controls for the radio application.

In response to detecting a gesture on previous favorite station 5056 (e.g., finger tap gesture 5037), the device changes the currently playing radio station to a previous radio station in a user-selected list of favorite radio stations. In response to detecting a gesture on stop/play toggle icon 5058 (e.g., finger tap gesture 5039), the device toggles between stopping and playing the current radio station. In response to detecting a gesture on next favorite station 5060 (e.g., finger tap gesture 5041), the device changes the currently playing radio station to a next radio station in the user-selected list of favorite radio stations. In response to detecting a gesture on station tuner/selector 5062 (e.g., a drag gesture with finger contact 5043), the device changes the radio frequency/radio station that the radio is tuned to in accordance with the gesture.

On the other hand, in response to detecting a gesture that is distinct from the gestures 5037, 5039, 5041, and 5043 on respective media player controls for the radio, the device replaces display of the first predefined set of media player controls (e.g., 5056, 5058, 5060, and 5062, FIG. 5I) with display of a second predefined set of media player controls (e.g., 5066, 5068, 5070, and 5072, FIG. 5K) and maintains playing of the first media item (e.g., the currently playing radio station). Exemplary gestures include a right-to-left swipe gesture made with finger contact 5035, or a tap gesture (not shown) that is detected away from the first predefined set of media player controls.

FIG. 5J illustrates an animation that may be displayed as the device replaces display of the first predefined set of media player controls (e.g., 5056, 5058, 5060, and 5062, FIG. 5I) with display of a second predefined set of media player controls (e.g., 5066, 5068, 5070, and 5072, FIG. 5K).

FIG. 5K displays a second set of media player controls for the radio (e.g., reverse icon 5066, pause/play toggle icon 5068, fast forward icon 5070, and playback progress slider 5072 that shows the current location in a song on the radio), as well as the smaller label 5054 for the radio station, information icon 5052, and media player control set-sequence-indicia icons 5024 for the two sets of media player controls for the radio application. The media player control set-sequence-indicia icons 5024 in FIG. 5K indicate that the second of two sets of media player controls for the radio is being displayed.

In response to detecting a gesture on reverse icon 5066 (e.g., finger tap gesture 5047), the device moves backwards in time (rewinds) in a buffer for the currently playing radio station. In response to detecting a gesture on pause/play toggle icon 5068 (e.g., finger tap gesture 5049), the device toggles between pausing and playing the currently selected radio station. In response to detecting a gesture on fast forward icon 5070 (e.g., finger tap gesture 5051), the device moves forwards in time in a buffer for the currently playing radio station. In some embodiments, in response to detecting a gesture on playback progress slider 5072 (e.g., a drag gesture with finger contact 5053), the device modifies the playback position in the currently playing song on the radio. In other embodiments, the playback progress slider 5072 just gives a visual indication of the current location in a song and is not user adjustable.

On the other hand, in response to detecting a gesture that is distinct from the gestures 5047, 5049, 5051, and 5053 on respective media player controls, the device replaces display of the second predefined set of media player controls (e.g., 5066, 5068, 5070, and 5072, FIG. 5K) with display of the first predefined set of media player controls (e.g., 5056, 5058, 5060, and 5062, FIG. 5I) and maintains playing of the first media item (e.g., the currently playing radio station). Exemplary gestures include a left-to-right swipe gesture made with finger contact 5045, or a tap gesture (not shown) that is detected away from the second predefined set of media player controls.

FIGS. 5L-5O illustrate selecting and using media player controls while a podcast is playing in a music application.

FIG. 5L illustrates a graphic 5012-2 that corresponds to a currently playing podcast (e.g. clock artwork for a podcast). Graphic 5012-2 is typically displayed in the background while the podcast player controls are displayed for the currently playing podcast, as indicated by the "5012-2" shown in FIGS. 5M-5O. Graphic 5012-2 provides context to the user, but the clock artwork graphic 5012-2 is not shown in FIGS. 5M-5O for clarity.

In response to detecting a gesture on the touch sensitive display 112 (e.g., finger tap gesture 5055), the device displays a first set of media player controls for the podcast (e.g., previous podcast icon 5076, pause/play toggle icon 5078, and next podcast icon 5080, as shown in FIG. 5M), as well as podcast information 5074 (e.g., podcast provider, episode number, date, etc), graphic 5012-2, and media player control set-sequence-indicia icons 5024 for the two sets of media player controls for podcasts.

In response to detecting a gesture on previous podcast icon 5076 (e.g., finger tap gesture 5059), the device restarts the currently playing podcast from its beginning or starts playing a previous podcast in a set of podcasts, depending on how long the current podcast has been playing. In response to detecting a gesture on play/pause toggle icon 5078 (e.g., finger tap gesture 5061), the device toggles the currently playing podcast between play and pause. In response to detecting a gesture on next podcast icon 5080 (e.g., finger tap gesture 5063), the device starts playing a next podcast in the set of podcasts.

On the other hand, in response to detecting a gesture that is distinct from the gestures 5059, 5061, and 5063 on respective media player controls, the device replaces display of the first predefined set of media player controls for podcasts (e.g., 5076, 5078, and 5080, FIG. 5M) with display of a second predefined set of media player controls (e.g., 5082, 5084, 5086, and 5090, FIG. 5O) and maintains playing of the first media item (e.g., the currently playing podcast). Exemplary gestures include a right-to-left swipe gesture made with finger contact 5057, or a tap gesture (not shown) that is detected away from the first predefined set of media player controls.

FIG. 5N illustrates an animation that may be displayed as the device replaces display of the first predefined set of media player controls for podcasts (e.g., 5076, 5078, and 5080, FIG. 5M) with display of a second predefined set of media player controls (e.g., 5082, 5084, 5086, and 5090, FIG. 5O).

FIG. 5O displays information about the currently playing media item (e.g., podcast info 5074, and graphic 5012-2), as well as a second set of media player controls for podcasts (e.g., repeat icon 5082, rewind 30 seconds icon 5084, playback speed icon 5086, and playback progress slider 5090 that shows the current location 5088 in the podcast and remaining time 5092). The media player control set-sequence-indicia icons 5024 in FIG. 5) indicate that the second of two sets of media player controls for podcasts is being displayed.

In response to detecting a gesture on repeat icon 5082 (e.g., finger tap gesture 5067), the device toggles among three states: repeating the current list of podcasts, repeating the current podcast, and not repeating either the current list of podcasts or the current podcast. In response to detecting a gesture on rewind 30 seconds icon 5084 (e.g., finger tap gesture 5069), the device rewinds the currently playing podcast by a preset amount (e.g., 30 seconds) and resumes the podcast at that point. In response to detecting a gesture on playback speed icon 5086 (e.g., finger tap gesture 5071), the device toggles among three states: playing the current podcast at normal (1×) speed, playing the podcast at a faster (e.g., 2×) speed, and playing the podcast at a slower (e.g., 0.5×) speed. In response to detecting a gesture on playback progress slider 5090 (e.g., a drag gesture with finger contact 5073), the device modifies the playback position in the currently playing podcast.

On the other hand, in response to detecting a gesture that is distinct from the gestures 5067, 5069, 5071, and 5073 on respective media player controls, the device replaces display of the second predefined set of media player controls for podcasts (e.g., 5082, 5084, 5086, and 5090, FIG. 5O) with display of the first predefined set of media player controls (e.g., 5076, 5078 and 5080, FIG. 5M) and maintains playing of the first media item (e.g., the currently playing podcast). Exemplary gestures include a left-to-right swipe gesture made with finger contact 5065, or a tap gesture (not shown) that is detected away from the second predefined set of media player controls.

FIGS. 6A-6D are flow diagrams illustrating a method 600 of selecting and using media player controls in accordance with some embodiments. The method 600 is performed at a multifunction device (e.g., device 300, FIG. 3A, device 300-1, FIG. 3B, or portable multifunction device 100, FIG. 1) with a display and a touch-sensitive surface. In some embodiments, the display is a touch screen and the touch-sensitive surface is on the display. In some embodiments, the display is separate from the touch-sensitive surface. Some operations in method 600 may be combined and/or the order of some operations may be changed.

As described below, the method 600 provides an efficient way to select and use media player controls. The method reduces the cognitive burden on a user when controlling a media player, thereby creating a more efficient human-machine interface. For battery-operated computing devices, enabling a user to select and use media player controls faster and more efficiently conserves power and increases the time between battery charges.

The device typically has a touch-sensitive display configured to separately display sets of media player controls on separate user interface screens. As used herein, "separately displayed" means that the sets of media player controls are displayed one at a time on the display (except during brief transitions between user interface screens, where portions of two sets of media player controls may be shown in an animated transition). The sets of media player controls include a first predefined set of media player controls and a second predefined set of media player controls. A user of the device controls the media player by interacting with the sets of media player controls.

The device displays (6002) the first predefined set of media player controls while playing a first media item (e.g., music player controls 5018, 5020, and 5022, FIG. 5B).

The device detects (6004) gestures on the touch-sensitive display while displaying the first predefined set of media player controls and playing the first media item. In some embodiments, the first media item may be paused when some of the gestures are detected.

In response to detecting a first gesture (e.g., finger tap gesture 5015, FIG. 5B), of the detected gestures, on a first media player control in the first predefined set of media player controls, the device activates (6006) the first media player control and controls playing of the first media item in accordance with activation of the first media player control.

In response to detecting a second gesture, of the detected gestures, the second gesture distinct from the first gesture, the device replaces (6008) display of the first predefined set of media player controls with display of the second predefined set of media player controls (e.g., music player controls 5026, 5028, 5030, and 5034, FIG. 5D) and maintains playing of the first media item.

In some embodiments, the second gesture is a swipe gesture (e.g., 5011, FIG. 5B) (6010). In some embodiments, the second gesture is a tap gesture (e.g., 5009, FIG. 5B)

(6012). In some embodiments, the second gesture is detected away from the first predefined set of media player controls (6014).

In some embodiments, in response to detecting the second gesture, the device displays (6016) an animation of the first predefined set of media player controls being replaced by the second predefined set of media player controls (e.g., the first predefined set of media player controls moves off-screen to the left while the second predefined set of media player controls moves on-screen from the right (FIG. 5C), or vice versa).

In some embodiments, in response to detecting a third gesture (left-to-right swipe gesture made with finger contact 5075, FIG. 5B), of the detected gestures, the third gesture distinct from the first gesture and the second gesture, the device replaces (6018) display of a current user interface screen (e.g., as shown in FIG. 5B) with a prior user interface screen (e.g., a playlist from which the currently playing song ('Song 3') was selected, as shown in FIG. 5G). The prior user interface screen is typically the user interface screen displayed immediately prior to the currently displayed user interface screen.

In some embodiments, the device concurrently displays (6020) a graphic (e.g., 5012-1, FIG. 5B) corresponding to the first media item while displaying the first predefined set of media player controls and playing the first media item. In response to detecting the second gesture, the device maintains display of the graphic corresponding to the first media item (e.g., 5012-1, FIG. 5D) while displaying the second predefined set of media player controls and maintaining playing of the first media item.

In some embodiments, the sets of media player controls include a number of sets of media player controls in a sequence. The device displays (6022) two or more set-sequence-indicia icons (e.g., 5024, FIG. 5B). The set-sequence-indicia icons provide information about the number of sets of media player controls and a position of a displayed media player controls set in the sequence of media player controls sets. In response to detecting the second gesture, the device updates the information provided by the set-sequence-indicia icons to reflect the replacement of the displayed first predefined set of media player controls by the displayed second predefined set of media player controls (e.g., 5024, FIG. 5D). In some embodiments, the number of sets of media player controls is two (6024).

In some embodiments, after detecting the second gesture, the device detects (6026) gestures on the touch-sensitive display while displaying the second predefined set of media player controls and playing the first media item. In response to detecting a fourth gesture (e.g. finger tap gesture 5023, FIG. 5D), of the detected gestures, on a second media player control in the second predefined set of media player controls, the device activates the second media player control and controls playing of the first media item in accordance with activation of the second media player control. In response to detecting a fifth gesture (e.g., left-to-right swipe gesture 5019, FIG. 5D), of the detected gestures, the fifth gesture distinct from the fourth gesture, the device replaces display of the second predefined set of media player controls (e.g., music player controls 5026, 5028, 5030, and 5034, FIG. 5D) with display of the first predefined set of media player controls (e.g., music player controls 5018, 5020, and 5022, FIG. 5B) and maintains playing of the first media item.

In some embodiments, the device detects (6028) no interaction with the touch-sensitive display for at least a predetermined period of time. In response to detecting no interaction with the touch-sensitive display for at least the predetermined period of time, the device ceases to display a currently displayed set of media player controls and maintains display of the graphic corresponding to the first media item (e.g., as shown in FIG. 5E).

In some embodiments, after ceasing to display the currently displayed set of media player controls, the device detects (6030) a gesture on the touch-sensitive display (e.g., a tap gesture in FIG. 5E). In response to detecting the gesture on the touch-sensitive display, the device displays a set of media player controls and maintains display of the graphic 5012 corresponding to the first media item (e.g., FIG. 5B). In some embodiments, the media player controls are displayed on top of the graphic corresponding to the first media item and the graphic corresponding to the first media item is visually deemphasized (e.g., by shading or darkening the graphic, not shown).

In some embodiments, the device detects (6032) a press-and-hold gesture on the touch-sensitive display (e.g., 5031, FIG. 5E). In response to detecting the press-and-hold gesture on the touch-sensitive display, the device replaces display of the first predefined set of media player controls with display of a menu screen (e.g., FIG. 5A). In some embodiments, while any application interface screen is displayed, the device responds to detection of a press-and-hold gesture by displaying a menu screen (e.g., a menu screen from a multipage menu that includes application launch icons, a home screen with application launch icons, or a screen with shortcut icons to predefined user interface screens (e.g., one or more of playlists, artists, genres, genius mixes, podcasts, songs, albums, and composers) within a media player application).

In some embodiments, the touch-sensitive display has physical dimensions of at least one of: two inches or less in width, and two inches or less in height (6034).

In some embodiments, the touch-sensitive display has a screen resolution of at least one of: 400 pixels or less in width, and 400 pixels or less in height (6036).

Figure 7:
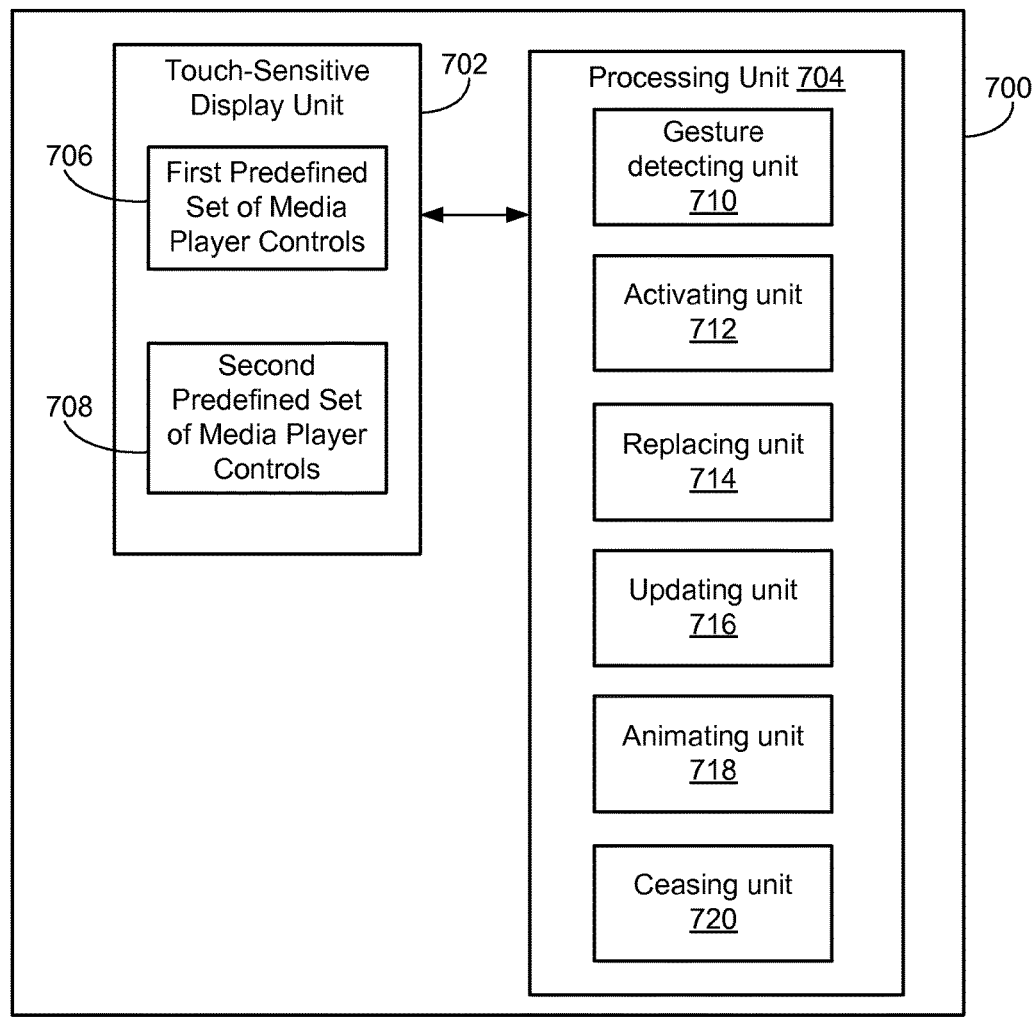
FIG. 7 is a functional block diagram of a portable electronic device in accordance with some embodiments.

In accordance with some embodiments, FIG. 7 shows a functional block diagram of a portable electronic device 700 configured in accordance with the principles of the invention as described above. The functional blocks of the electronic device may be implemented by hardware, software, or a combination of hardware and software to carry out the principles of the invention. It is understood by persons of skill in the art that the functional blocks described in FIG. 7 may be combined or separated into sub-blocks to implement the principles of the invention as described above. Therefore, the description herein may support any possible combination or separation or further definition of the functional blocks described herein.

As shown in FIG. 7, a touch-sensitive display unit 702 is configured to separately display sets of media player controls, including a first predefined set of media player controls 706 and a second predefined set of media player controls 708. A processing unit 704 is coupled to the touch-sensitive display unit 702. The touch-sensitive display unit 702 displays the first predefined set of media player controls 706 while the processing unit 704 plays a first media item (e.g., FIG. 5B). The processing unit may comprise: a gesture detecting unit 710, which detects gestures on the touch-sensitive display unit 702 while the touch-sensitive display unit 702 displays the first predefined set of media player controls 706 and the processing unit 704 plays the first media item; an activating unit 712 which, in response to detecting a first gesture, of the detected gestures by the gesture detecting unit 710, on a first media player control in the first predefined set of media player controls 706, activates the first media player control and controls playing of the first media item in accordance with activation of the first media player control; and a replacing unit 714 which, in response to detecting a second gesture, of the detected gestures by the gesture detecting unit 710, the second gesture distinct from the first gesture, replaces display of the first predefined set of media player controls 706 with display of the second predefined set of media player controls 708 on the touch-sensitive display unit 702 and maintains playing of the first media item (e.g., FIG. 5D).

In some embodiments, in response to detecting a third gesture, of the detected gestures by the gesture detecting unit 710, the third gesture distinct from the first gesture and the second gesture, the replacing unit 714 replaces display of a current user interface screen with a prior user interface screen.

In some embodiments, the processing unit 704 enables a graphic corresponding to the first media item to be concurrently displayed on the touch-sensitive display unit 702 while the touch-sensitive display unit 702 displays the first predefined set of media player controls 706 and the processing unit 704 plays the first media item. In response to detecting the second gesture, the processing unit 704 maintains display of the graphic corresponding to the first media item on the touch-sensitive display unit 702 while the touch-sensitive display unit 702 displays the second predefined set of media player controls 708 and the processing unit 704 maintains playing of the first media item.

In some embodiments, the sets of media player controls include a number of sets of media player controls in a sequence. The touch-sensitive display unit 702 displays two or more set-sequence-indicia icons. The set-sequence-indicia icons provide information about the number of sets of media player controls and a position of a displayed media player controls set in the sequence of media player controls sets. The processing unit 704 may further comprise an updating unit 716 that, in response to detecting the second gesture, updates the information provided by the set-sequence-indicia icons to reflect the replacement of the displayed first predefined set of media player controls by the displayed second predefined set of media player controls on the touch-sensitive display unit 702. In some embodiments, the number of sets of media player controls is two.

In some embodiments, the second gesture is a swipe gesture. In some embodiments, the second gesture is a tap gesture. In some embodiments, the second gesture is detected away from the first predefined set of media player controls.

In some embodiments, the processing unit 704 may further comprise an animating unit 718 that, in response to detecting the second gesture, enables an animation of the first predefined set of media player controls being replaced by the second predefined set of media player controls on the touch-sensitive display unit 702.

In some embodiments, after detecting the second gesture, the gesture detecting unit 710 detects gestures on the touch-sensitive display unit 702 while the touch-sensitive display unit 702 displays the second predefined set of media player controls 708 and the processing unit 704 plays the first media item. In response to detecting a fourth gesture, of the detected gestures by the gesture detecting unit 710, on a second media player control in the second predefined set of media player controls 708, the activating unit 714 activates the second media player control and controls playing of the first media item in accordance with activation of the second media player control. In response to detecting a fifth gesture, of the detected gestures by the gesture detecting unit 710, the fifth gesture distinct from the fourth gesture, the replacing unit 714 replaces display of the second predefined set of media player controls 708 with display of the first predefined set of media player controls 706 on the touch-sensitive display unit 702 and maintains playing of the first media item.

In some embodiments, the processing unit 704 may further comprise a ceasing unit 720 that, in response to detecting no interaction with the touch-sensitive display for at least the predetermined period of time by the gesture detecting unit 710, ceases to display a currently displayed set of media player controls and maintains display of the graphic corresponding to the first media item on the touch-sensitive display unit 702.

In some embodiments, after ceasing to display the currently displayed set of media player controls on the touch-sensitive display unit 702 by the ceasing unit 720, the gesture detecting unit 710 detects a gesture on the touch-sensitive display unit 702. In response to detecting the gesture on the touch-sensitive display unit 702, the processing unit 704 displays a set of media player controls and maintains display of the graphic corresponding to the first media item on the touch-sensitive display unit 702.

In some embodiments, the gesture detecting unit 710 detects a press-and-hold gesture on the touch-sensitive display unit 702. In response to detecting the press-and-hold gesture on the touch-sensitive display unit 702 by the gesture detecting unit 710, the replacing unit 714 replaces display of the first predefined set of media player controls with display of a menu screen on the touch-sensitive display unit 702.

In some embodiments, the touch-sensitive display unit 702 has physical dimensions of at least one of: 2 inches or less in width, and 2 inches or less in height. In some embodiments, the touch-sensitive display unit 702 has a screen resolution of at least one of: 400 pixels or less in width, and 400 pixels or less in height.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B, 3A, 3B) are all included within the scope of protection of the invention.

The operations described above with reference to FIGS. 6A-6D, may be implemented by components depicted in FIGS. 1A-1C. For example, detection operation 6004, activation and control operation 6006 and replacement operation 6008 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176, object updater 177 or GUI updater 178 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A portable electronic device, comprising:
a touch-sensitive display, the touch-sensitive display configured to separately display sets of media player controls, including a first predefined set of media player controls and a second predefined set of media player controls;
one or more processors;
memory; and
one or more programs, wherein the one or more programs are stored in the memory and configured to be executed by the one or more processors, the one or more programs including instructions for:
displaying the first predefined set of media player controls while playing a first media item;
detecting gestures on the touch-sensitive display while displaying the first predefined set of media player controls and playing the first media item;
in response to detecting a first gesture, of the detected gestures, on a first media player control in the first predefined set of media player controls, activating the first media player control and controlling playing of the first media item in accordance with activation of the first media player control, wherein the first gesture is a first type of gesture; and,
in response to detecting a second gesture, of the detected gestures, replacing display of the first predefined set of media player controls with display of the second predefined set of media player controls and maintaining playing of the first media item, wherein the second gesture is distinct from the first gesture, the second gesture is a second type of gesture different from the first type of gesture, and the second gesture is detected while displaying the first predefined set of media player controls, and wherein the media player controls in the first predefined set of media player controls are distinct from the media player controls in the second predefined set of media player controls.

2. The device of claim 1, including instructions for:
in response to detecting a third gesture, of the detected gestures, the third gesture distinct from the first gesture and the second gesture, replacing display of a current user interface screen with a prior user interface screen.

3. The device of claim 1, including instructions for:
concurrently displaying a graphic corresponding to the first media item while displaying the first predefined set of media player controls and playing the first media item; and
in response to detecting the second gesture, maintaining display of the graphic corresponding to the first media item while displaying the second predefined set of media player controls and maintaining playing of the first media item.

4. The device of claim 1, wherein the sets of media player controls include a number of sets of media player controls in a sequence; and further including instructions for:
displaying two or more set-sequence-indicia icons, wherein the set-sequence-indicia icons provide information about the number of sets of media player controls and a position of a displayed media player controls set in the sequence of media player controls sets; and,
in response to detecting the second gesture, updating the information provided by the set-sequence-indicia icons to reflect the replacement of the displayed first predefined set of media player controls by the displayed second predefined set of media player controls.

5. The device of claim 1, including instructions for:
in response to detecting the second gesture, displaying an animation of the first predefined set of media player controls being replaced by the second predefined set of media player controls.

6. The device of claim 1, including instructions for:
after detecting the second gesture, detecting gestures on the touch-sensitive display while displaying the second predefined set of media player controls and playing the first media item;
in response to detecting a fourth gesture, of the detected gestures, on a second media player control in the second predefined set of media player controls, activating the second media player control and controlling playing of the first media item in accordance with activation of the second media player control; and,
in response to detecting a fifth gesture, of the detected gestures, the fifth gesture distinct from the fourth gesture, replacing display of the second predefined set of media player controls with display of the first predefined set of media player controls and maintaining playing of the first media item.

7. The device of claim 3, including instructions for:
detecting no interaction with the touch-sensitive display for at least a predetermined period of time; and,
in response to detecting no interaction with the touch-sensitive display for at least the predetermined period of time:
ceasing to display a currently displayed set of media player controls; and
maintaining display of the graphic corresponding to the first media item.

8. A method, comprising:
at a portable electronic device with a touch-sensitive display, the touch-sensitive display configured to separately display sets of media player controls, including a first predefined set of media player controls and a second predefined set of media player controls:
displaying the first predefined set of media player controls while playing a first media item;
detecting gestures on the touch-sensitive display while displaying the first predefined set of media player controls and playing the first media item;
in response to detecting a first gesture, of the detected gestures, on a first media player control in the first predefined set of media player controls, activating the first media player control and controlling playing of the first media item in accordance with activation of the first media player control, wherein the first gesture is a first type of gesture; and, in response to detecting a second gesture, of the detected gestures, replacing display of the first predefined set of media player controls with display of the second predefined set of media player controls and maintaining playing of the first media item, wherein the second gesture is distinct from the first gesture, the second gesture is a second type of gesture different from the first type of gesture, and the second gesture is detected while displaying the first predefined set of media player controls, and wherein the media player controls in the first predefined set of media player controls are distinct from the media player controls in the second predefined set of media player controls.

9. A graphical user interface on a portable electronic device with a touch-sensitive display, a memory, and one or more processors to execute one or more programs stored in the memory, the graphical user interface comprising:
separately displayed sets of media player controls, including a first predefined set of media player controls and a second predefined set of media player controls
wherein:
the first predefined set of media player controls is displayed while a first media item is played;
gestures on the touch-sensitive display are detected while the first predefined set of media player controls is displayed and the first media item is played;
in response to detection of a first gesture, of the detected gestures, on a first media player control in the first predefined set of media player controls, the first media player control is activated and playing of the first media item is controlled in accordance with activation of the first media player control, wherein the first gesture is a first type of gesture; and,
in response to detection of a second gesture, of the detected gestures, display of the first predefined set of media player controls is replaced with display of the second predefined set of media player controls and playing of the first media item is maintained, wherein the second gesture is distinct from the first gesture, the second gesture is a second type of gesture different from the first type of gesture, and the second gesture is detected while displaying the first predefined set of media player controls, and wherein the media player controls in the first predefined set of media player controls are distinct from the media player controls in the second predefined set of media player controls.

10. A non-transitory computer readable storage medium storing one or more programs, the one or more programs comprising instructions which, when executed by a portable electronic device with a touch-sensitive display, the touch-sensitive display configured to separately display sets of media player controls, including a first predefined set of media player controls and a second predefined set of media player controls, cause the device to:
display the first predefined set of media player controls while playing a first media item;
detect gestures on the touch-sensitive display while displaying the first predefined set of media player controls and playing the first media item;
in response to detecting a first gesture, of the detected gestures, on a first media player control in the first predefined set of media player controls, activate the first media player control and control playing of the first media item in accordance with activation of the first media player control, wherein the first gesture is a first type of gesture; and in response to detecting a second gesture, of the detected gestures, replace display of the first predefined set of media player controls with display of the second predefined set of media player controls and maintain playing of the first media item, wherein the second gesture is distinct from the first gesture, the second gesture is a second type of gesture different from the first type of gesture, and the second gesture is detected while displaying the first predefined set of media player controls, and wherein the media player controls in the first predefined set of media player controls are distinct from the media player controls in the second predefined set of media player controls.

11. The method of claim 8, including:
in response to detecting a third gesture, of the detected gestures, the third gesture distinct from the first gesture and the second gesture, replacing display of a current user interface screen with a prior user interface screen.

12. The method of claim 8, including:
concurrently displaying a graphic corresponding to the first media item while displaying the first predefined set of media player controls and playing the first media item; and
in response to detecting the second gesture, maintaining display of the graphic corresponding to the first media item while displaying the second predefined set of media player controls and maintaining playing of the first media item.

13. The method of claim 8, wherein the sets of media player controls include a number of sets of media player controls in a sequence; and further including:
displaying two or more set-sequence-indicia icons, wherein the set-sequence-indicia icons provide information about the number of sets of media player controls and a position of a displayed media player controls set in the sequence of media player controls sets; and,
in response to detecting the second gesture, updating the information provided by the set-sequence-indicia icons to reflect the replacement of the displayed first predefined set of media player controls by the displayed second predefined set of media player controls.

14. The method of claim 8, including:
in response to detecting the second gesture, displaying an animation of the first predefined set of media player controls being replaced by the second predefined set of media player controls.

15. The method of claim 8, including:
after detecting the second gesture, detecting gestures on the touch-sensitive display while displaying the second predefined set of media player controls and playing the first media item;
in response to detecting a fourth gesture, of the detected gestures, on a second media player control in the second predefined set of media player controls, activating the second media player control and controlling playing of the first media item in accordance with activation of the second media player control; and,
in response to detecting a fifth gesture, of the detected gestures, the fifth gesture distinct from the fourth gesture, replacing display of the second predefined set of media player controls with display of the first predefined set of media player controls and maintaining playing of the first media item.

16. The method of claim 12, including:
detecting no interaction with the touch-sensitive display for at least a predetermined period of time; and, in response to detecting no interaction with the touch-sensitive display for at least the predetermined period of time:
    ceasing to display a currently displayed set of media player controls; and
    maintaining display of the graphic corresponding to the first media item.

17. The non-transitory computer readable storage medium of claim 10, including instructions which cause the device to:
    in response to detecting a third gesture, of the detected gestures, the third gesture distinct from the first gesture and the second gesture, replace display of a current user interface screen with a prior user interface screen.

18. The non-transitory computer readable storage medium of claim 10, including instructions which cause the device to:
    concurrently display a graphic corresponding to the first media item while displaying the first predefined set of media player controls and playing the first media item; and
    in response to detecting the second gesture, maintain display of the graphic corresponding to the first media item while display the second predefined set of media player controls and maintaining playing of the first media item.

19. The non-transitory computer readable storage medium of claim 10, including instructions which cause the device to, wherein the sets of media player controls include a number of sets of media player controls in a sequence; and further including instructions which cause the device to:
    display two or more set-sequence-indicia icons, wherein the set-sequence-indicia icons provide information about the number of sets of media player controls and a position of a displayed media player controls set in the sequence of media player controls sets; and,
    in response to detecting the second gesture, update the information provided by the set-sequence-indicia icons to reflect the replacement of the displayed first predefined set of media player controls by the displayed second predefined set of media player controls.

20. The non-transitory computer readable storage medium of claim 10, including instructions which cause the device to:
    in response to detecting the second gesture, display an animation of the first predefined set of media player controls being replaced by the second predefined set of media player controls.

21. The non-transitory computer readable storage medium of claim 10, including instructions which cause the device to:
    after detecting the second gesture, detect gestures on the touch-sensitive display while displaying the second predefined set of media player controls and playing the first media item;
    in response to detecting a fourth gesture, of the detected gestures, on a second media player control in the second predefined set of media player controls, activate the second media player control and controlling playing of the first media item in accordance with activation of the second media player control; and,
    in response to detecting a fifth gesture, of the detected gestures, the fifth gesture distinct from the fourth gesture, replace display of the second predefined set of media player controls with display of the first predefined set of media player controls and maintain playing of the first media item.

22. The non-transitory computer readable storage medium of claim 18, including instructions which cause the device to:
    detect no interaction with the touch-sensitive display for at least a predetermined period of time; and,
    in response to detecting no interaction with the touch-sensitive display for at least the predetermined period of time:
        cease to display a currently displayed set of media player controls; and
        maintain display of the graphic corresponding to the first media item.

23. The portable electronic device of claim 1, wherein the first type of gesture is any one of a tap gesture and a drag gesture, and wherein the second type of gesture is any one of a tap gesture, a swipe gesture, and a press-and-hold gesture.

24. The portable electronic device of claim 1, wherein the first type of gesture is a tap gesture and the second type of gesture is a tap-and-hold gesture.

25. The portable electronic device of claim 1, wherein:
    the first predefined set of media player controls includes a pause icon which, when activated, pauses playback of the first media item, and
    the second predefined set of media player controls includes a shuffle icon which, when activated, shuffles playback of media.

26. The portable electronic device of claim 25, wherein:
    the first predefined set of media player controls includes a next icon which, when activated, starts playback of a next media in a playlist, and
    the second predefined set of media player controls includes a repeat icon which, when activated, initiates a mode to repeatedly play back the first media item.

27. The portable electronic device of claim 25, wherein:
    the first predefined set of media player controls does not include the shuffle icon which, when activated, shuffles playback of media, and
    the second predefined set of media player controls does not include the pause icon which, when activated, pauses playback of the first media item.

28. The method of claim 8, wherein the first type of gesture is any one of a tap gesture and a drag gesture, and wherein the second type of gesture is any one of a tap gesture, a swipe gesture, and a press-and-hold gesture.

29. The method of claim 8, wherein the first type of gesture is a tap gesture and the second type of gesture is a tap-and-hold gesture.

30. The method of claim 8, wherein:
    the first predefined set of media player controls includes a pause icon which, when activated, pauses playback of the first media item, and
    the second predefined set of media player controls includes a shuffle icon which, when activated, shuffles playback of media.

31. The method of claim 30, wherein:
    the first predefined set of media player controls includes a next icon which, when activated, starts playback of a next media in a playlist, and
    the second predefined set of media player controls includes a repeat icon which, when activated, initiates a mode to repeatedly play back the first media item.

32. The method of claim 30, wherein:
    the first predefined set of media player controls does not include the shuffle icon which, when activated, shuffles playback of media, and the second predefined set of media player controls does not include the pause icon which, when activated, pauses playback of the first media item.

33. The non-transitory computer readable storage medium of claim 10, wherein the first type of gesture is any one of a tap gesture and a drag gesture, and wherein the second type of gesture is any one of a tap gesture, a swipe gesture, and a press-and-hold gesture.

34. The non-transitory computer readable storage medium of claim 10, wherein the first type of gesture is a tap gesture and the second type of gesture is a tap-and-hold gesture.

35. The non-transitory computer readable storage medium of claim 10, wherein:
   the first predefined set of media player controls includes a pause icon which, when activated, pauses playback of the first media item, and
   the second predefined set of media player controls includes a shuffle icon which, when activated, shuffles playback of media.

36. The non-transitory computer readable storage medium of claim 35, wherein:
   the first predefined set of media player controls includes a next icon which, when activated, starts playback of a next media in a playlist, and
   the second predefined set of media player controls includes a repeat icon which, when activated, initiates a mode to repeatedly play back the first media item.

37. The non-transitory computer readable storage medium of claim 35, wherein:
   the first predefined set of media player controls does not include the shuffle icon which, when activated, shuffles playback of media, and
   the second predefined set of media player controls does not include the pause icon which, when activated, pauses playback of the first media item.

38. The device of claim 1, wherein operations performed in response to detecting activation of corresponding media player controls in the first predefined set of media player controls are distinct from operations performed in response to detecting activation of corresponding media player controls in the second predefined set of media player controls.

39. The method of claim 8, wherein operations performed in response to detecting activation of corresponding media player controls in the first predefined set of media player controls are distinct from operations performed in response to detecting activation of corresponding media player controls in the second predefined set of media player controls.

40. The non-transitory computer readable storage medium of claim 10, wherein operations performed in response to detecting activation of corresponding media player controls in the first predefined set of media player controls are distinct from operations performed in response to detecting activation of corresponding media player controls in the second predefined set of media player controls.

\* \* \* \* \*